(12) United States Patent
Ivrii et al.

(10) Patent No.: US 12,475,287 B2
(45) Date of Patent: Nov. 18, 2025

(54) EQUIVALENCE CHECKING OF SYNTHESIZED LOGIC DESIGNS USING GENERATED SYNTHESIS HISTORY

(71) Applicant: International Business Machines Corporation, Armonk, NY (US)

(72) Inventors: Alexander Ivrii, Haifa (IL); Jason Raymond Baumgartner, Austin, TX (US); Robert Lowell Kanzelman, Rochester, MN (US); Mark Allen Williams, Pleasant Valley, NY (US); Mihir Choudhury, Jersey City, NJ (US); Ayesha Akhter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 767 days.

(21) Appl. No.: 17/829,811

(22) Filed: Jun. 1, 2022

(65) Prior Publication Data

US 2023/0394212 A1 Dec. 7, 2023

(51) Int. Cl.
*G06F 30/3323* (2020.01)
*G06F 30/327* (2020.01)

(52) U.S. Cl.
CPC ........ *G06F 30/3323* (2020.01); *G06F 30/327* (2020.01)

(58) Field of Classification Search
USPC ....................................................... 716/106
See application file for complete search history.

(56) References Cited

U.S. PATENT DOCUMENTS

| 8,683,398 B1 | 3/2014 | Choudhury et al. |
| 10,037,190 B2 | 7/2018 | Choudhury et al. |
| 11,922,130 B2 | 3/2024 | Choudhury et al. |
| 2009/0150136 A1* | 6/2009 | Yang ...................... G06F 30/33 703/13 |
| 2009/0228849 A1* | 9/2009 | Mossawir ........... G06F 30/3323 716/106 |
| 2009/0300560 A1* | 12/2009 | Weber .................. G06F 30/3312 716/106 |

OTHER PUBLICATIONS

Kaufmann et al. "Verifying Large Multipliers by Combining SAT and Computer Algebra", IEEE/ 2019 Formal Methods in Computer Aided Design (FMCAD), Nov. 11, 2019, 9 pages.

Mishchenko et al. "Recording Synthesis History for Sequential Verification", FMCAD '08: Proceedings of the 2008 International Conference on Formal Methods in Computer-Aided Design, Nov. 17, 2008, pp. 1-8 (7 pages), Article No. 4.

Stoffel et al. "Verification of Integer Multipliers on the Arithmetic Bit Level" IEEE/ACM International Conference on Computer Aided Design, Aug. 7, 2002, 1- 7.

(Continued)

*Primary Examiner* — Mohammed Alam
(74) *Attorney, Agent, or Firm* — Tihon Poltavets

(57) ABSTRACT

An example system includes a processor to receive a high-level design representation of a system architecture. The processor can synthesize a logic design and generate an associated synthesis history based on the high-level hardware design representation. The processor can then execute an equivalence check between the high-level design and the synthesized logic design based on the generated synthesis history.

14 Claims, 8 Drawing Sheets

(56) References Cited

OTHER PUBLICATIONS

Wedler et al. "Normalization at the Arithmetic bit level", DAC '05: Proceedings of the 42nd annual Design Automation Conference, Jun. 13, 2005, 457-462.
Chang et al., "Self-referential verification of gate-level implementations of arithmetic circuits", IEEE Transactions on Computer-Aided Design of Integrated Circuits and Systems, Jun. 10-14, 2002, 6 pages.
Ciesielski et al., "Verification of Gate-level Arithmetic Circuits by Function Extraction", IEEE Transactions on Computer-Aided Design of Integrated Circuits and Systems, Jun. 7-11, 2015, 6 pages.
Eisenbiegler et al., "A Constructive Approach towards Correctness of Synthesis—Application with Retiming", Proceedings European Design and Test Conference. ED & TC 97, Mar. 1997, pp. 427-431.
Mell et al., "The NIST Definition of Cloud Computing", National Institute of Standards and Technology, U.S. Department of Commerce, Special Publication 800-145, Sep. 2011, 7 pages.
Yu et al., "Formal Analysis of Galois Field Arithmetic Circuits—Parallel Verification and Reserve Engineering", Transactions on Computer-Aided Design of Integrated Circuits and Systems, Feb. 21, 2018, 12 pages.
Wikipedia. "Logic synthesis", retrieved from web https://web.archive.org/web/20220505005427/https://en.wikipedia.org/wiki/Logic_synthesis, May 5, 2022, 4 Pages.

\* cited by examiner

300

EQUIVALENCE CHECKING OF SYNTHESIZED LOGIC DESIGNS USING GENERATED SYNTHESIS HISTORY

BACKGROUND

The present techniques relate to logic synthesis. More specifically, the techniques relate to equivalence checking (EC) between synthesized logic designs and their high-level representations.

Logic synthesis is a process by which a higher-level design representation such as Hardware Description Language (HDL) is synthesized into a gate-level netlist. Logic synthesis tools may attempt to produce high-performance gate-level logic that is optimized in terms of propagation delay, area and power. Some logic synthesis tools may also integrate many synergistic rewriting and optimization techniques.

Functional verification is often performed on pre-synthesis HDL to detect errors. However, there is significant opportunity for logic bugs to be introduced by synthesis tools during synthesis. Therefore, equivalence checking may be used to confirm that that pre-synthesis HDL is functionally-equivalent to bit-level post-synthesis gate-level netlist, also referred to herein as a Bit-level post-Synthesis Design (BSD). The functional-equivalence may be achieved using Equivalence Checking (EC), which may include Combinational Equivalence Checking (CEC) and Sequential Equivalence Checking (SEC). In some cases, the state-holding elements may be one-to-one correlated, and then a CEC unit may verify functional-equivalence of the combinational logic between corresponding state-holding elements. For example, the state-holding elements may include latches, random access memory (RAM), registers, etc. In some cases, the state-holding elements may not be one-to-one correlated. For example, the synthesis tool may use retiming to move latches or registers across combinational gates, and 1:1 state-holding element correspondence is impossible. In these cases, a SEC unit may be necessary to verify functional-equivalence. SEC is in a higher complexity class than CEC, because SEC is PSPACE-complete and CEC is NP-complete. The functionally-equivalent synthesized HDL may then be ultimately run through a physical synthesis and fabricated.

EC tools may be used to perform light, correct-by-construction synthesis of the HDL into a bit-level gate-level netlist, referred herein to as a Bit-level Verification Design (BVD), without using any intricate and risky optimizations to yield high-performance gate-level logic. Then, verification algorithms may be used to prove functional-equivalence of the BVD versus the BSD. These verification algorithms may use brute-force, possibly exponential-runtime proof techniques, such as Boolean Satisfiability Solvers (SATs) and Binary Decision Diagrams (BDDs). For example, equivalence may be checked at various compare-points, including the overall design's primary inputs and outputs, as well as the inputs and outputs of corresponding state-holding elements. However, the scalability of this equivalence check may often heavily depend on whether BSD and BVD have many internal equivalences between those compare points.

Arithmetic logic in particular may be difficult for EC, often resulting in an exponential runtime. For example, arithmetic logic may involve ADD, SUBTRACT, MULTIPLY, and COMPARE operators. There are multiple reasons for the complexity of arithmetic logic. First, there are many ways to implement an arithmetic primitive, such as an adder or a multiplier, using bit-level gates. This may be partially due to associative and commutative properties of addition. For example, a 32×32 bit multiplier can be synthesized in millions of different ways using thousands of bit-level adders, also referred to as compressors. Many of these implementations may have little internal equivalence to each other, nor to the simple correct-by-construction BVD netlist. This lack of equivalence may result in heavy brute-force EC proofs. In addition, modern synthesis algorithms are highly sophisticated to yield highly-optimized post-synthesis logic, with capability to combine multiple arithmetic gates into one. For example, Fused Multiply-ADDs of the form $Z<=A\times B+C$ may be represented as one large multi-operand ADD. Such synthesis algorithms may also include the capability to rewrite COMPARE gates into ADD boxes and to optimize operands of arithmetic expressions enabling smaller bit-level representations. The synthesis algorithms may also be able to rewrite arithmetic expressions with respect to delay or slack information of arithmetic-gate input and output pins, which can vary tremendously at each synthesis run. Further, the synthesis algorithms may rewrite and optimize gates across the boundary of arithmetic logic when late synthesis transforms aggressively optimize the entire gate-level design after arithmetic expressions have been expanded to simpler generic AND and OR type gates. In such instances, the BSD may not generally have sub-circuits corresponding precisely to original arithmetic expressions. Finally, techniques used in EC tools, such as BDDs and SAT algorithms, may tend to exhibit worst-case exponential runtime for exclusive-or (XOR)-rich logic as is common in arithmetic logic. As one simple example, even exhaustively verifying equivalence of two structurally-dissimilar N×N multiplier implementations becomes slow at around 12×12 bits and is intractable at around 20×20 bits.

Thus, if the synthesis tool includes advanced arithmetic logic optimizations, EC may be catastrophically slow. Semiconductor developers may not allow a synthesis tool run to be accepted if the EC does not converge. There are several ways to cope with this challenge. For example, in one workaround approach, a verification expert may study the BSD and attempt to manually create a BVD such that the BVD and the BSD have many internally equivalent signals. However, this process may be extremely time-consuming and error-prone. For example, studying the post-synthesis netlist may be tedious, and every synthesis run may produce a vastly-different outcome. Thus, this effort may be expended multiple times during the design process. Furthermore, if synthesis introduces a logic bug, additional effort may be taken to ensure that the manually-created BVD does not introduce the same logic bug. Another workaround approach may be to restrict the allowed synthesis techniques in order to make equivalence checking practical. For example, the logic within an arithmetic expression may be protected to prevent the synthesis process from combining or optimizing across that protected logic, or the type of partial products expansions that may be used for a multiplier may be restricted. However, this approach is unattractive because it may prevent the synthesis from yielding a highest-quality logic. Yet another workaround approach is to manually synthesize the HDL using a high-performance detailed implementation instead of using simple behavioral arithmetic expressions. In particular, this limits synthesis from making aggressive arithmetic logic optimizations. However, this approach is time-consuming and also error-prone. For example, such approach may yield bloated HDL which hurts functional verification scalability, and ultimately yield suboptimal post-synthesis logic because timing information from the current synthesis run cannot be as thoroughly leveraged when deciding how to implement compressor trees. Practically, therefore, this challenge has prevented semiconductor developers from using such advanced arithmetic synthesis, or caused some to pursue one of various workarounds.

Moreover, manual techniques such as theorem proving are not practical even for CEC. These techniques may require tedious studying of the BSD at each synthesis run. In addition, arithmetic provers such as Satisfiability Modulo Theories solvers may be able to reason about isolated behavioral arithmetic, but not the bit-optimized BSD, thus obviating their use in CEC. While some automated arithmetic verification techniques have been proposed, none of them reliably work on heavily bit-optimized arithmetic designs. Moreover, none of these automated arithmetic verification techniques apply when late synthesis is allowed to rewrite across the boundaries of arithmetic expressions.

SUMMARY

According to an embodiment described herein, a system can include processor to receive a high-level design representation of a system architecture. The processor can also further synthesize a logic design and generate an associated synthesis history based on the high-level hardware design representation. The processor can also execute an equivalence check between the high-level design and the synthesized logic design based on the generated synthesis history. The system can thus enable automated and efficient equivalence checks between high-level designs and synthesized logic designs while allowing synthesis to include various more aggressive optimizations. Preferably, the synthesized logic design is a gate-level netlist. In this embodiment, the gate-level netlist can be translated to physical designs and fabricated. Preferably, the synthesis history includes an arithmetic synthesis history generated and stored during an early synthesis and optimizing arithmetic primitives of the high-level representation. In this embodiment, optimizations performed during early synthesis and arithmetic optimization may be replayed on the high-level design to automatically construct a logic design used for comparing against the synthesized logic design. Preferably, the synthesis history includes a set of extensible basic record types. In this embodiment, the system may provide a basic set of record types for specifying choices performed by synthesis. Preferably, the high-level design includes logic described using a hardware design language (HDL). In this embodiment, the HDL may provide a suitable description that can be translated into more specific formats for purposes of synthesis and verification.

According to another embodiment described herein, a method can include receiving, via a processor, a high-level design representation of a system architecture. The method can further include synthesizing, via the processor, a logic design and generating an associated synthesis history based on the high-level hardware design representation. The method can also further include executing, via the processor, an equivalence check between the high-level design and the synthesized logic design (BSD) based on the generated synthesis history. The method can thus enable automated and efficient equivalence checks between high-level designs and synthesized logic designs including various optimizations. Preferably, generating the associated synthesis history includes generating and storing an arithmetic synthesis history during an early synthesis and optimizing arithmetic primitives of the high-level design representation. In this embodiment, early synthesis and optimization of arithmetic primitives may then be replayed to generate a design that is similar to the design produced by synthesis. Preferably, the method includes replaying, via the processor, the high-level design using the synthesis history to generate a bit-level design (BVD) representation used for the equivalence check. In this embodiment, the BVD may then efficiently be compared with a BSD in a similar format. Optionally, synthesizing the logic design includes instrumenting the logic design with the associated synthesis history. Preferably, executing the equivalence check includes comparing the synthesized logic design to a generated bit-level design (BVD), where the synthesized logic design includes a bit-level post-synthesis gate-level logic (BSD) netlist. In this embodiment, the BSD and BVD may be compared using a bit-level comparison tool.

According to another embodiment described herein, a computer program product for synthesized logic verification can include computer-readable storage medium having program code embodied therewith. The program code executable by a processor to cause the processor to receive a high-level design representation of a system architecture. The program code can also cause the processor to synthesize a logic design and generate an associated synthesis history based on the high-level hardware design representation. The program code can also cause the processor to execute an equivalence check of the high-level design and synthesized logic design based on the generated synthesis history. The program code can thus enable automated and efficient equivalence checks of high-level designs and synthesized logic designs including various optimizations. Preferably, the program code can also cause the processor to generate and store an arithmetic synthesis history during an early synthesis and optimization of arithmetic primitives of the high-level representation. Preferably, the program code can also cause the processor to replay the synthesis history to generate a bit-level design representation used for the equivalence check. In this embodiment, generate a bit-level design representation may more accurately reflect changes made during synthesis. Preferably, the computer program product includes program code executable by the processor to instrument the logic design with the associated synthesis history. In this embodiment, the instrumented logic design may be sent to a verification tool for analysis. Preferably, the computer program product includes program code executable by the processor to compare the synthesized logic design to a generated bit-level design (BVD), where the synthesized logic design includes a bit-level post-synthesis gate-level logic (BSD) netlist. In this embodiment, the BVD and BSD may be compared using a bit-level comparison tool.

According to another embodiment described herein, a method can include receiving, via a processor, a high-level design representation of a system architecture to be synthesized. The method can further include generating and storing, via the processor, an arithmetic synthesis history during early synthesis and optimization of arithmetic primitives of the high-level design representation. The method can also further include replaying, via the processor, the arithmetic synthesis history to perform similar modifications on the high-level design to generate a bit-level design (BVD). The method can also include executing, via the processor, an equivalence check by comparing the generated BVD to a post-synthesis BSD netlist. The method can thus enable automated equivalence checks of more complex early synthesis and optimization of arithmetic primitives. Preferably, in response to detecting that a record cannot be processed successfully, generating, via the processor, a report listing the problematic record. In this embodiment, the generated report may be used to analyze specific records. Preferably, the method includes generating, via the processor, a one-to-one correspondence between verification high-level design (HDL-V) and synthesis high-level design (HDL-S) arithmetic boxes. In this embodiment, one-to-one correspondence may be used to track equivalent HDL-V and HDL-S boxes and signals during verification. Preferably, the method includes correlating, via the processor, constants between a verification high-level design (HDL-V) and a synthesis high-level design (HDL-S) in a label-to-net map. In this embodiment, the label-to-net map may be used during verification to map between differently named signals. Preferably, the method includes processing, via the processor, each record in the arithmetic synthesis history based on record type. In this embodiment, a predefined set of basic record types may be used to replay the arithmetic synthesis history during verification.

According to another embodiment described herein, a system can include processor to receive a high-level design representation of a system architecture to be synthesized. The processor can also further generate and store an arithmetic synthesis history during early synthesis and optimization of arithmetic primitives of the high-level design representation. The processor can also replay the arithmetic synthesis history to perform similar modifications on the high-level design for verification (HDL-V) to generate a bit-level design (BVD). The processor can also further execute an equivalence check by comparing the generated BVD to a post-synthesis BSD netlist. Thus, the system can enable automated equivalence checks of more complex early synthesis and optimization of arithmetic primitives. Preferably, the processor is to generate a report listing specific problematic records in response to detecting that all of the arithmetic synthesis history is not replayable. In this embodiment, the generated report may be used to analyze specific records. Optionally, the arithmetic synthesis history is not replayable due to a synthesis bug. In this embodiment, synthesis bugs may be detected and fixed. Preferably, the replayed arithmetic synthesis history is used as a guidance for expansion, rewriting, and optimization of the high-level design. In this embodiment, the system may more accurately detect any issues caused during synthesis. Preferably, the BVD and BSD netlist each include Boolean logic. In this embodiment, the BVD and BSD may be easily compared using any suitable Boolean based equivalence checker.

DETAILED DESCRIPTION

According to embodiments of the present disclosure, system includes a processor to receive a high-level design representation of a system architecture. The processor can synthesize a logic design and generate an associated synthesis history based on the high-level hardware design representation. The processor can then execute an equivalence check between the high-level design and the synthesized logic design based on the generated synthesis history. Thus, embodiments of the present disclosure enable an automated and efficient verification of more aggressive synthesis transforms to support the production of improved hardware microprocessor chips. For example, the more aggressive transforms may improve the chips in terms of propagation delay, area, and reduced power usage. Moreover, the embodiments do not pose any restrictions on early or late logic synthesis. For example, the arithmetic logic can be rewritten, combined, renamed, or deleted, and late optimizations across the boundary of arithmetic logic are allowed. The techniques thus provide for a reliable, fully-automated equivalence checking (EC) method that applies to highly-optimized synthesis. In this manner, the techniques may enable the automated verification of more aggressively optimized system architecture designs.

Figure 1:
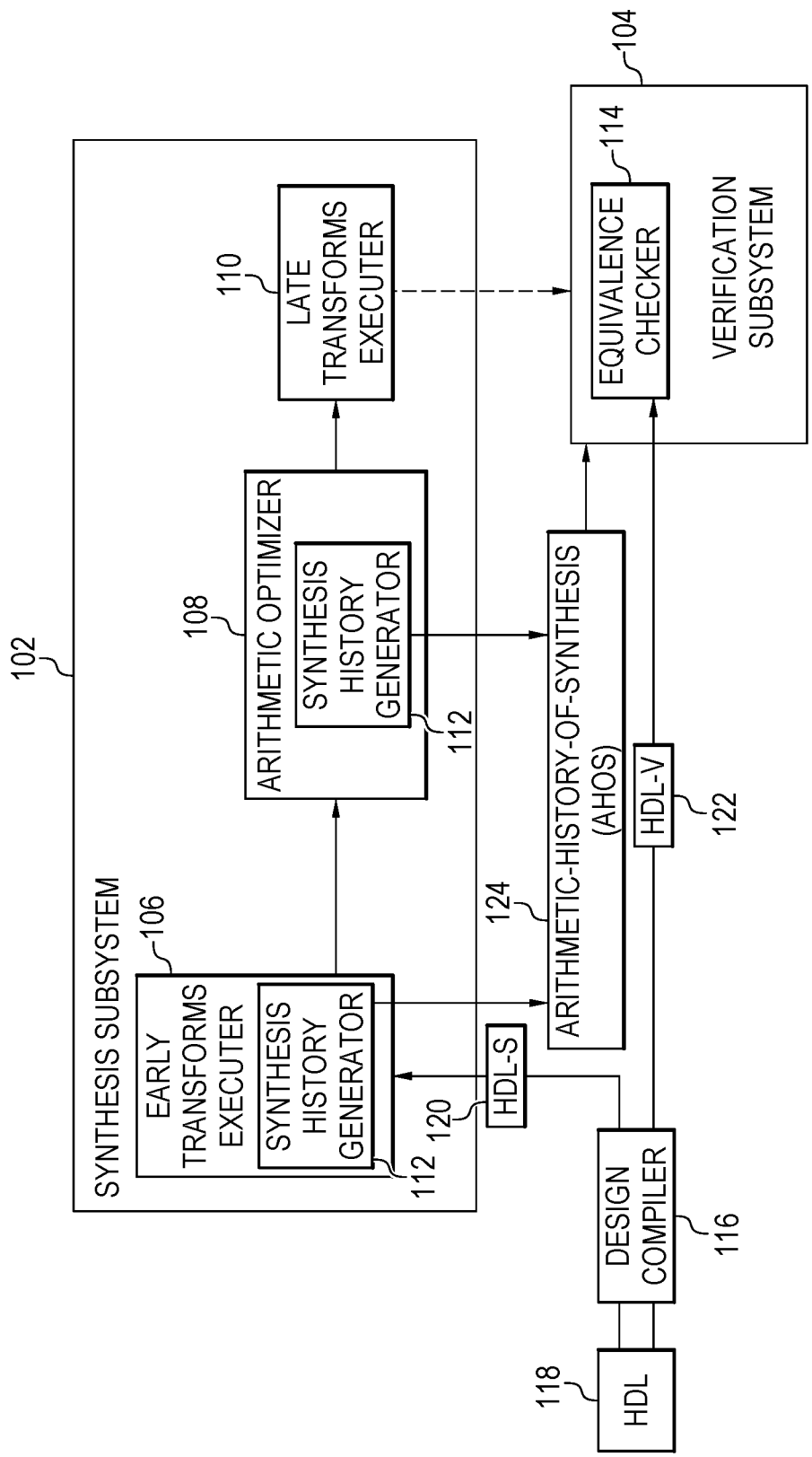
FIG. 1 is a block diagram of an example system for equivalence checking of system architecture logic using a generated synthesis history.

With reference now to FIG. 1, a block diagram shows an example system for equivalence checking of system architecture logic using a generated synthesis history. The example system 100 of FIG. 1 includes a synthesis subsystem 102 communicatively coupled to a verification subsystem 104. The synthesis subsystem 102 may be a synthesis tool. The synthesis subsystem 102 includes an early transforms executer 106. For example, the early transforms executer 106 may execute any optional transforms that may precede the arithmetic optimizer 108.

The synthesis subsystem 102 further includes an arithmetic optimizer 108 communicatively coupled to the early transforms executer 106. For example, the arithmetic optimizer 108 may receive a design in the form of a netlist with vectored boxes named ADD, COMPARE, MULTIPLY and apply arithmetic optimization operations as described herein. The vectored boxes may not simply be Boolean signals, but rather bit-vectors, such as 128-bit numbers.

The synthesis subsystem 102 also includes a late transforms executer 110 communicatively coupled to the arithmetic optimizer 108. In various examples, the late transforms executer 110 may receive a bit-level design that may be a netlist without arithmetic primitives and only AOI logic. As used herein, AOI logic refers to bit-level logic consisting of bit-level ANDs, ORs and Inverters. For example, the arithmetic optimizer 108 may convert all bit vectors to bit-level logic, thus late transforms may only applied on the bit-level design. The late transforms executer 110 may execute additional optimizations, such as timing optimizations to reduce propagation delay, and technology mapping to convert the logic gates into logic cells of the target device. For example, the technology mapping may convert gates to the actual physical logic cells that are put on the physical device. The output of the late transforms executer 110 may be an optimized bit-level design with no arithmetic primitives and only AOI logic. The late transforms executer 110 may not generate any history to be stored in the AHoS 124.

The early transforms executer 106 and the arithmetic optimizer 108 include a synthesis history generator 112. For example, the synthesis history generator 112 may generate a history of actions taken by the early transforms executer 106 and the arithmetic optimizer 108. In some examples, the synthesis history generator 112 may be a single module, though in practice 106 and 108 may not generally generate the same records. For example, the early transforms executer 106 may merge identical boxes and rename signals, but may not generally optimize adders. The arithmetic optimizer 108 may perform any of various optimizations, including optimization of adders.

The verification subsystem 104 includes an equivalence checker 114. For example, the equivalence checker 114 can verify that no bugs are present in the final bit-level design generated during the synthesis flow of the synthesis subsystem 102 by executing an equivalence check between the final bit-level design and an original high-level design as described in detail below. In various example, the equivalence checker 114 can perform CEC or SEC. In some examples, the verification subsystem 104 or equivalence checker 114 may also include a formal verification tool (not shown).

The system 100 further includes a design compiler 116 communicatively coupled to the synthesis subsystem 102 and the verification subsystem 104. The design compiler 116 is shown receiving a hardware design language (HDL) description 118 of a system architecture. In various examples, the HDL 118 may be any high level description of a system architecture to be synthesized. For example, the high level description may be Verilog first released in 1984, VHSIC Hardware Description Language (VHDL) first released by the Very High Speed Integrated Circuit (VHSIC) Program in 1985, SystemVerilog first released in 2009, or any other suitable HDL for system architecture design. The design compiler 116 is shown generating an HDL-S 120 and HDL-V 122. For example, the HDL-S 120 and HDL-V 122 may be bit vector-level formats representing the HDL 118. In various examples, the HDL-S 120 and HDL-V 122 may be netlists with vectored arithmetic boxes. The synthesis subsystem 102 is shown receiving the HDL-S 120. The verification subsystem 104 is shown receiving the HDL-V 122. In various examples, arithmetic boxes may include ADD, SUB, COMPARE, and MULTIPLY boxes. The synthesis history generator 112 is shown storing synthesis history in an arithmetic-history-of-synthesis (AHoS) 124 communicatively coupled to the synthesis history generator 112 of the synthesis subsystem 102. The AHoS 124 stores synthesis history information. For example, the AHoS 124 may be an external file that stores history information as a list of records, with each record corresponding to a basic expansion, rewriting, or optimization step performed by the synthesis subsystem 102. In various examples, there may be many early transforms or arithmetic optimization algorithms, and each can create its own AHoS file 124. In some examples, these AHoS files 124 may then be combined into a single AHoS file 124. The AHoS 124 is also communicatively coupled to the verification subsystem 104.

In the example of FIG. 1, the synthesis subsystem 102 and the verification subsystem 104 are shown receiving HDL 116. In general, the synthesis subsystem 102 may optimize the HDL 118 to generate a bit-level post-synthesis gate-level logic that is optimized for propagation delay, area in terms of the number of total gates used, and power usage. The verification subsystem 104 may perform equivalence checking and verification to ensure that errors are not present in the generated bit-level post-synthesis gate-level logic. For example, the equivalence checker 114 may check that the pre-synthesis HDL 118 is functionally equivalent to the generated bit-level post-synthesis gate-level logic. For example, given any particular inputs, the equivalence checker 114 may check that the bit-level post-synthesis gate-level logic produces exactly the same outputs as the HDL 118.

In various examples, the synthesis subsystem 102 and verification subsystem 104 may work on different internal netlist representations. For example, an original high-level design (HDL) 118 may be used to generate HDL-S for the synthesis subsystem 102 and HDL-V for the verification subsystem 104. Thus, in various examples, the synthesis subsystem 102 may work with and modify an HDL-S netlist, eventually producing a bit-level design netlist (BSD) sent to the EC 114 as shown by an arrow. The EC 114 of the verification subsystem 104 may import an HDL-V 122 and the BSD, and compare the HDL-V 122 netlist to the post-synthesis BSD netlist. In various examples, an Arithmetic History-of-Synthesis guided analysis may be applied to the HDL-V 122 netlist, eventually producing a BVD.

In some examples, the early transforms executer 106 may receive a HDL-S with vectored boxes named ADD, SUB, COMPARE and MULTIPLY and apply various early transforms on this design. Examples of early transforms include flattening of a hierarchical design representation into a monolithic netlist, light redundancy removal, and light logic-expansion. For example, light redundancy removal may include pruning sinkless logic, and simple optimizations such as constant propagation, and merging identical gate-types with identical inputs. In various examples, merging same-type boxes with same inputs may also be an early synthesis transform. For example, if X=A+B, and Y=A+B, then X can be replaced by Y. In some examples, light logic expansion may include converting certain gates to an alternate normalized form, such as replacing "greater-than" compare z:=A>B by a less-than compare z:=B<A.

In various examples, during early synthesis and optimization of arithmetic primitives, the synthesis subsystem 102 can store synthesis history information in the AHoS 124. For example, the early transforms executer 106 and the arithmetic optimizer 108 may both store synthesis history information in the AHoS 124. In some examples, the synthesis history information may be organized as a list of records. For example, each record may correspond to a basic expansion, rewriting, or optimization step performed by the synthesis subsystem 102.

As described above, the arithmetic optimizer 108 of the synthesis subsystem 102 may execute any combination of a variety of arithmetic synthesis optimizations to replace arithmetic logic with lower-level gates. A set of example optimizations is described herein. In describing these optimizations, an N-input bit-vector X may be represented as $[X_{N-1}, \ldots, X_1, X_0]$, where the intermediate bits of X are ordered from the most significant bit $X_{N-1}$ to the least significant bit $X_0$. As used herein, a bit $X_i$ is in the "column" or the "strand" i of vector X. In addition, as used herein, the symbols '+', '−', and '*' represent bit vector addition, subtraction and multiplication, respectively. Moreover, as used herein, the symbol '~' represents bitwise inversion, and thus ~X corresponds to the bit vector $\sim X=[\sim X_{N-1}, \ldots, \sim X_1, \sim X_0]$. In various examples, an arithmetic k-operand N-bit-wide ADD box implements bit vector addition. The ADD box may have k N-bit-wide operands $A^1=[A^1_{N-1}, \ldots, A^1_1, A^1_0], \ldots, A^k=[A^k_{N-1}, \ldots, A^k_1, A^k_0]$, and N-bit-wide output $Z=[Z_{N-1}, \ldots, Z_1, Z_0]$, such that $Z=A^1+\ldots+A^k$. An arithmetic 2-operand N-bit-wide SUBTRACT box implements bit vector subtraction. The SUBTRACT box may have 2 N-bit-wide operands $A=[A_{N-1}, \ldots, A_1, A_0]$ and $B=[B_{N-1}, \ldots, B_1, B_0]$, and N-bit-wide output $Z=[Z_{N-1}, \ldots, Z_1, Z_0]$, such that $Z=A-B$. An arithmetic 2-operand N-bit-wide MULTIPLY box implements bit vector multiplication. The MULTIPLY Box may have 2 N-bit-wide inputs $[A=[A_{N-1}, \ldots, A_1, A_0]$ and $B=B_1, B_0]$, and 2N-bit-wide output $Z=[Z_{2N-1}, \ldots, Z_1, Z_0]$, such that $Z=A*B$. An arithmetic 2-operand N-bit-wide less-than COMPARE box has 2 N-bit-wide inputs $A=[A_{N-1}, \ldots, A_1, A_0]$ and $B=[B_{N-1}, \ldots, B_1, B_0]$, a 1-bit-wide output Z, and comparison operator '<', such that $Z=A<B$. In various examples, other supported comparison operators may be '<=', '>', '>=', '==', and '!='. All arithmetic operations can be either signed or unsigned. For an ADD box, the notation <z, k> may reflect that the signal z appears in column k of the box (that is, corresponds to some $A^i_k$). In some examples, the use of '*' for an output of an arithmetic BOX, may be used when this output is "disconnected". An output may be considered disconnected when the output is not used anywhere in the netlist. Using these conventions, several example arithmetic rewriting and optimization techniques that may be used by the synthesis subsystem 102 are described as follows.

In some examples, the arithmetic optimizer 108 can convert SUBTRACT boxes into ADD boxes. For example, the Subtraction $Z=A-B$ can be translated to addition $Z=A+\sim B+1$.

In various examples, the arithmetic optimizer 108 can convert MULTIPLY boxes into ADD boxes. For example, the arithmetic optimizer 108 can convert the unsigned multiplication $A\times B$ of two N-input operands $A=[A_{N-1}, \ldots A_1, A_0]$ and $B=[B_{N-1}, \ldots B_1, B_0]$ into addition by creating $N^2$ partial-product gates $P_{ij}=AND(A_i, B_j)$, each with the coefficient $2^{i+j}$, and adding these gates together. As one example, $[Z_5, Z_4, Z_3, Z_2, Z_1, Z_0]=[A_2, A_1, A_0]\times[B_2, B_1, B_0]$ can be translated to: $[Z_5, Z_4, Z_3, Z_2, Z_1, Z_0]=[0, 0, 0, P_{02}, P_{01}, P_{00}]+[0, 0, P_{12}, P_{11}, P_{10}, 0]+[0, P_{22}, P_{21}, P_{20}, 0, 0]$. This example uses a simple "array" or "quadratic" partial-products expansion. In various examples, other types of partial-products expansions, such as Booth expansion, may be used. For example, such other expansions may be used to trade area for better delay.

In some examples, the arithmetic optimizer 108 can convert COMPARE boxes into ADD boxes. For example, the arithmetic optimizer 108 can convert the unsigned comparison $Z=A>B$ into addition by extending A and B by one bit, and examining the most significant output bit of $A+\sim B$. As one example, $Z=[A_2, A_1, A_0]>[B_2, B_1, B_0]$ can be converted to: $[Z, *, *, *]=[0, A_2, A_1, A_0]+[0, \sim B_2, \sim B_1, \sim B_0]$. For this conversion, other expansions are also possible. For example, $Z=[A_2, A_1, A_0]>[B_2, B_1, B_0]$ can be also converted to: $[\sim Z, *, *, *]=1=[0, \sim A_2, \sim A_1, \sim A_0]+[0, B_2, B_1, B_0]+[0, 0, 0, 1]$.

In various examples, the arithmetic optimizer 108 can optimize ADD boxes using column optimizations. In some examples, the arithmetic optimizer 108 can replace two copies of a signal at column k of an ADD box by a single copy of this signal at column k+1. For example, the arithmetic optimizer 108 can replace <z, k>+<z, k>=<z, k+1> when k<N, and <z, k>+<z, k>=0 when k=N-1. As one specific example, $[Z_2, Z_1, Z_0]=[A_2, A_1, A_0]+[B_2, A_1, B_0]$ can be rewritten as: $[Z_2, Z_1, Z_0]=[A_2, 0, A_0]+[B_2, 0, B_0]+[A_1, 0, 0]$, with the column optimization technique applied to signal $A_1$ at column 1.

In some examples, the arithmetic optimizer 108 can optimize ADD boxes using row optimizations. For example, this optimization technique may reflect identical signals appearing at different columns of an ADD box. As one example, <z, 2>+<z, 3>+<z, 4>+<z, 5> is equivalent to <z, 6>-<z, 2>. The subtraction may be converted into addition, that is <z, 6>-<z, 2>=<z, 6>+~<z, 2>+1. In this example, the row optimization technique consumes four occurrences of signal z at columns 2-5, inserting an expression with fewer occurrences of z. As a more specific example: $[Z_6, Z_5, Z_4, Z_3, Z_2, Z_1, Z_0]=[A_6, A_5, A_4, A_3, A_2, A_1, A_0]+[B_6, z, z, z, z, B_1, B_0]$ can be rewritten as: $[Z_6, Z_5, Z_4, Z_3, Z_2, Z_1, Z_0]=[A_6, A_5, A_4, A_3, A_2, A_1, [A_0]+[B_6, 0, 0, 0, B_1, B_0]+z, 0, 0, 0, 0, 0]+[1, 1, 1, 1, \sim z, 1, 1]+[0, 0, 0, 0, 0, 0, 1]$.

In various examples, the arithmetic optimizer 108 can also coalesce adjacent ADD boxes. For example, the arithmetic optimizer 108 can combine multiple adjacent adders into one multi-operand adder in any of a variety of ways. In various examples, in a basic technique, given two ADD boxes referred to herein as a child box and parent box of the same width N such that for each k=0, ..., N-1 the kth output of the child box is connected to one of the column-k inputs of the parent box, the two boxes can be coalesced into one multi-operand ADD box. As one example, a child box may represent: $[Z_2, Z_1, Z_0]=[A_2, A_1, A_0]+[B_2, B_1, B_0]$, and a parent box may represent: $[W_2, W_1, W_0]=[U_2, U_1, U_0]+[Z_2, Z_1, Z_0]$. The arithmetic optimizer 108 can replace the parent box by: $[W_2, W_1, W_0]=[U_2, U_1, U_0]+[A_2, A_1, A_0]+[B_2, B_1, B_0]$. In various examples, this technique can be easily extended to the case when a child box has width larger than the width of a parent box. For example, given a child box representing: $[Z_2, Z_1, Z_0]=[A_2, A_1, A_0]+[B_2, B_1, B_0]$, and a parent box representing: $[W_1, W_0]=[U_1, U_0]+[Z_1, Z_0]$, then the parent box can be replaced by: $[W_1, W_0]=[U_1, U_0]+[A_1, A_0]+[B_1, B_0]$. In some examples, the technique can be also extended to the case when a child box has a width smaller than a width of a parent box, provided that the child box cannot have a nonzero carryout to the column past its width. For example, given a child box representing: $[Z_2, Z_1, Z_0]=[0, A_1, A_0]+[0, B_1, B_0]$, then the carryout from the MSB column 2 may always be zero. Further, given a parent box representing: $[W_3, W_2, W_1, W_0]=[U_3, U_2, U_1, U_0]+[Z_3, Z_2, Z_1, Z_0]$, then the parent box can be rewritten as: $[W_3, W_2, W_1, W_0]=[U_3, U_2, U_1, U_0]+[Z_3, Z_2, 0, 0]+[0, 0, A_1, A_0]+[0, 0, B_1, B_0]$. In various examples, the technique can be also extended to the case when a child box has a width smaller than a width of a parent box, but the child box can have a nonzero carryout to the column past its width. This case may be more complicated because a correct procedure requires reasoning about "sum truncation" bits of the child adder. Thus, a correct procedure may first extend the width of the child box creating new output signals, not present in the original HDL, to account for possible carryouts. The procedure may then coalesce the two adders. For example, given a child box representing: $[Z_2, Z_1, Z_0]=[A_2, A_1, A_0]+[B_2, B_1, B_0]$, and a parent box representing: $[W_3, W_2, W_1, W_0]=[U_3, U_2, U_1, U_0]+[Z_3, Z_2, Z_1, Z_0]$. The technique first extends the width of the child box by one bit, creating a new output signal T, that replaces the child box by: $[T, Z_2, Z_1, Z_0]=[0, A_2, A_1, A_0]+[0, B_2, B_1, B_0]$, and then replaces the parent box by: $[W_3, W_2, W_1, W_0]=[U_3, U_2, U_1, U_0]+[Z_3, 0, 0, 0]+[0, A_2, A_1, A_0]+[0, B_2, B_1, B_0]+[\sim T, 0, 0, 0]+[1, 0, 0]$. This technique can also be extended to the case when for every k the kth output of a child box is connected to the inversion of one of the column-k inputs of the parent box. For example, given a child box representing: $[Z_2, Z_1, Z_0]=[A_2, A_1, A_0]+[B_2, B_1, B_0]$, and a parent box representing: $[W_2, W_1, W_0]=[U_2, U_1, U_0]+[\sim Z_2 \sim Z_1 \sim Z_0]$, then the parent box can be rewritten as: $[W_2, W_1, W_0]=[U_2, U_1, U_0]+[\sim A_2, \sim A_1 \sim A_0]+[\sim B_2, \sim B_1, \sim B_0]+[0, 1, 0]$. The adjacent add coalescing technique can be also extended to the case when the child box needs to be aligned so that the outputs of the child box match the respective inputs of the parent box. For example, given a child box representing: $[Z_2, Z_1, Z_0]=[0, A_1, A_0]+[0, B_1, B_0]$, and a parent box representing: $[W_2, W_1, W_0]=[U_2, U_1, U_0]+[Z_4, Z_3, Z_2]$, then the column-2 output $Z_2$ of the child box matches the column-0 input of the parent box. Aligning and coalescing the adders allows to replace the parent box by: $[W_2, W_1, W_0, Z_1, Z_0]=[U_2, U_1, U_0, 0, 0]+[Z_4, Z_3, 0, 0, 0]+[0, 0, A_3, A_1, A_0]+[0, 0, B_2, B_1, B_0]$. In various examples, this coalescing technique can be used repeatedly to combine multiple adders. For example, given: $[W_2, W_1, W_0]=[U_2, U_1, U_0]+[Z_2, Z_1, Z_0], [Z_2, Z_1, Z_0]=[A_2, A_1, A_0]+[B_2, B_1, B_0], [B_2, B_1, B_0]=[K_2, K_1, K_0]+[L_2, L_1, L_0]$, the synthesis subsystem 102 can rewrite the top ADD box as: $[W_2, W_1, W_0]=[U_2, U_1, U_0]+[A_2, A_1, A_0]+[K_2, K_1, K_0]+[L_2, L_1, L_0]$.

In some examples, the arithmetic optimizer 108 can implement ADD boxes using compressor trees. For example, some synthesis algorithms may implement k-input N-bit-wide ADD boxes using bit-level adders, also referred to as compressors. In various examples, this process may involve iteratively choosing a column k of the adder, and two or three signals in this column, and creating a half- or a full-adder that consumes these signals and produces the sum output (inserted to column k of the adder) and the carry output (inserted to column k+1 of the adder), until only two N-bit-wide inputs remain. The two N-bit-wide inputs may then be summed using a final 2-input adder. In some examples, this technique can also be extended to handle more general compressors that consume various signals in various columns and insert outputs to various columns. For example, such general compressors may include 8:3 compressors, etc. In general, there may be a large number of choices of which signals to add and in which order to add the signals. In some examples, the arithmetic optimizer 108 may choose a compressor tree to leverage timing information and to minimize circuit delay. Due to associative and commutative properties of addition, this may be powerful and flexible delay-optimization technique. As one example, given an ADD box representing: $[Z_2, Z_1, Z_0]=[A_2, A_1, A_0]+[B_2B_1, B_0]+[C_2C_1, C_0]+[D_2, D_1, D_0]$. On a first iteration, the synthesis subsystem 102 can choose column=1 and signals $\{A_1, B_1, D_1\}$, construct a 1-bit-wide full-adder with inputs $A_1, B_1, D_1$ and outputs "sum"=P, and "carry"=Q, and rewrite the ADD box as: $[Z_2, Z_1, Z_0]=[A_2, P, A_0]+[B_2, 0, B_0]+[C_2, C_1, C_0]+[D_2, 0, D_0]+[Q, 0, 0]$. Later iterations may be similarly executed.

In various examples, the synthesis subsystem 102 can rename signals and boxes. For example, during synthesis, individual signals and arithmetic boxes may be referenced by some label. In various examples, the labels of certain signals or boxes may thus change throughout the synthesis flow. For example, the early transforms executer 106 or the arithmetic optimizer 108 may rename any number of signals and boxes.

In some examples, the synthesis subsystem 102 can merge equivalent signals and boxes. For example, the synthesis subsystem 102 may discover that some signals are functionally equivalent and thus representing the same logic function, and may thus simplify the netlist based on this equivalence. In some examples, the synthesis subsystem 102 may also discover that some arithmetic boxes are functionally equivalent, and merge the outputs of one box onto the outputs of the other. As one example, an HDL 118 may be received with two multipliers: $[Z_5, Z_4, Z_3, Z_2, Z_1, Z_0]=[A_2, A_1, A_0]*[B_2, B_1, B_0]$ and $[U_5, U_4, U_3, U_2, U_1, U_0][B_2, B_1, B_0]*[A_2, A_1, A_0]$. Since multiplication is commutative, $[Z_5, Z_4, Z_3, Z_2, Z_1, Z_0]=[U_5, U_4, U_3, U_2, U_1, U_0]$, allowing to merge each $Z_i$ to the respective $U_i$, or vice versa. In various examples, the early transforms executer 106 or the arithmetic optimizer 108 may thus merge any number of equivalent signals and boxes.

In various examples, the synthesis subsystem 102 can clone signals and boxes. For example, the synthesis subsystem 102 may sometimes replicate signals or boxes for better delay, allowing each copy to be physically placed nearer to its respective fanout logic. For example, given an adder: $[Z_2, Z_1, Z_0]=[A_2, A_1, A_0]=[B_2, B_1, B_0]$ with two or more fanout references, the synthesis subsystem 102 may choose to make a copy: $[Zc_2, Zc_1, Zc_0]=[A_2, A_1, A_0]=[B_2, B_1, B_0]$ and reconnect a subset of fanouts to this copy. In various examples, the early transforms executer 106 or the arithmetic optimizer 108 may thus clone any number of signals and boxes.

Still referring to FIG. 1, the verification subsystem 104 can replay the AHoS 124 to perform similar expansion, rewriting, optimization steps on the high-level design. For example, the verification subsystem 104 may replay the AHoS 124 before or during execution of the EC at the equivalence checker 114. In various examples, the AHoS 124 is used as a guidance for verification. For example, the verification subsystem 104 may perform correct expansion, rewriting, and optimization, even when some of the records in the AHoS 124 may be incorrect or cannot be replayed. In various examples, when some of AHoS 124 cannot be replayed, the EC tool 114 may pinpoint and display the problematic record, thus enabling a user to understand the problem. For example, the problem may be a synthesis bug. In some examples, tool bugs may be reported and resolved to prevent such bugs from interfering with future synthesis and EC sessions.

In some examples, when all of AHoS 124 can be replayed by the verification subsystem 104, the resulting EC problem may contain many internal equivalences and thus enable scalable equivalence checking. Thus, even if the late transforms executer 110 of the synthesis subsystem 102 applies late-synthesis transforms after arithmetic expansion to low-level gates, and thus aggressively rewrites logic resulting from early-synthesis arithmetic optimization, these late-synthesis transforms may not be practically powerful enough to massively diverge the expanded arithmetic gates. Therefore, a scalable EC may be maintained using the replayed AHoS 124 with a comparable scalability as if the aggressive arithmetic synthesis was not performed. Optionally, in some examples, additional methods may additionally be used to cover late-synthesis transforms.

In various examples, any suitable technique may be used to correlate the original arithmetic boxes between HDL-V and HDL-S netlists in a one-to-one manner. For example, the line or box in the original HDL code may be associated with each of the boxes in the HDL-V and HDL-S netlists. In various examples, the original arithmetic boxes may include ADDs, SUBTRACTs, MULTIPLYs and COMPAREs. However, individual signals in the HDL-V and HDL-S netlists may not be able to be similarly correlated. In particular, this may be partially because signal names may be unspecified or fabricated. In various examples, the correlation between individual signals may be derived from the various AHoS 124 records. As used herein, logic signals used by the synthesis subsystem 102 are referred to as net labels or labels, while logic signals used by the verification subsystem 104 are referred to as nets. In various examples, the system 100 may maintain a label_to_net map from synthesis labels to verification nets. For example, multiple labels can map to the same verification net. In some examples, initially, the maps may be set label_to_net["0"]=constant-0 net, and label_to_net["1"]=constant-1 net to ensure correct interpretation of constants. In some examples, two special labels may be used. In particular, as used herein, the label "0" may represent constant-0 signal, while the label "1" may represent a constant-1 signal. In addition, as previously noted, inverted signals may be specified using the symbol "~". Thus, —a represents an inverted signal a. Furthermore, as used herein, the label "*" may be used to avoid specifying a label due to a "disconnected pin." In particular, disconnected output pins do not affect the semantics of the arithmetic box, and can occur when no logic signal depends on a given arithmetic box output value. Each disconnected output pin may thus be reflected in AHoS 124 records with 1-character token "*". In various examples, disconnected input pins may generally be disallowed, as they may entail ambiguous semantics. However, inputs may always be shown populated in the AHoS 124 to reflect correct semantics. For example, inputs may be populated using 0-padding versus sign-extending input operands.

In various examples, the AHoS 124 may include any combination of a number of basic record types. For example, the records may be sufficiently expressive to precisely describe all the expansion and transformation steps performed by synthesis subsystem 102 upon arithmetic expressions. Correct arithmetic synthesis tools may only implement trusted, textbook transforms. However, a given synthesis tool may have various code bugs where the code does not accurately perform the desired transform. The EC 114 may thus detect any mistakes resulting from those code bugs. In addition, in various examples, the language of the AHoS 124 may be as simple as reasonably possible to enable the use of a simpler EC 114. Thus, in various examples, a small number of basic record types may be used in the AHoS 124. Some individual synthesis transforms may thus be represented by multiple simpler AHoS 124 records. In some examples, if a synthesis transform cannot be described in terms of supported AHoS 124 records, then synthesis tool developers may review why their transform is correct. For example, a different type of multiplier partial-products expansion may be supported. In some examples, an EC support team may verify offline that the general transform is indeed correct, and then minimally expand the language of the AHoS 124 to support a new individual transform. The record types of the AHoS 124 may thus be expandable to fit the usage of a particular user. In various examples, every record in the AHoS 124 may have additional information. For example, the additional information may include comments, or the HDL file and line where an arithmetic box appears. Such additional information may be useful by the synthesis or EC tool development teams, or the end-users of synthesis subsystem 102 or verification subsystem 104. Additionally, in various examples, every record may have a unique record_name. For example, future records may refer to previous records using their unique record_name. As described herein, labels, nets, and record_names are represented as strings, with upper-case strings representing labels, and lower-case strings representing nets.

In various examples, the AHoS file 124 produced by the synthesis subsystem 102 may thus include a list of basic records. In some examples, the order of various records in the Arithmetic-History-of-Synthesis file may be important. In particular, the records may be processed or replayed in the order they appear. Additionally, as described above, each record may have a unique 1-token name that enables cross-referencing. In various examples, later records can refer to earlier records, but not the converse. Records may also refer to box_names and net_labels, and other previously-written record_names. For example, box_names may refer to identifiers for arithmetic boxes. As described above, the net labels refer to signals used by the synthesis subsystem have been already described.

In some examples, the most basic record types may be Instance_ADD, Instance_SUBTRACT, Instance_MULTIPLY, and Instance_COMPARE records. These record types may allow the synthesis subsystem 102 to indicate an individual ADD, SUBTRACT, MULTIPLY and COMPARE box, together with type, number of its operands, the widths of its operands and outputs, and labels of nets connected to its inputs and outputs pins. A box type record information may include additional information required to specify the arithmetic operation. For example, for multipliers, the box type may be used to distinguish between SIGNED MULTIPLIERS and UNSIGNED MULTIPLIERS. In another example, the additional information may be used to distinguish between the COMPARE boxes z:=A<B and z:=A>B. For example, indicating a COMPARE with inputs A, B and output z may not be enough information, and the box type information may specify if the COMPARE record is a "less than" or "greater than" COMPARE box. An example of an Instance_ADD record, with 2 operands of width 3 follows:

```
Instance_ADD
    record_name: Instance_ADD:1; box_name: MY_ADD1
    operand1: A2 A1 A0; operand2: B2 B1 B0; outputs: Z2 Z1 Z0
    comment: optional info, e.g. "source_file: my_adder.v;
    source_line: 123"; END
``` where semicolons representing additional carriage returns are used herein to save space. In various examples, whether to explicitly show a carry_in input label, and a carry_out output label, with Instance_ADD may be implementation-dependent because carry_in can be represented by a third operand where only the least-significant bit is non-0, and carry_out can be represented by padding an extra most-significant output bit. In various examples, the verification subsystem 104 can replay this record. For example, the verification subsystem 104 can first find the matching adder box MY_ADD1 in HDL-V and produce an error if the number of operands, input width, or output width do not match. In some examples, the verification subsystem 104 can also recognize various normalized discrepancies. For example, such normalized discrepancy may be representing a 2-operand subtractor as semantically-equivalent 3-operand adder. For each input and output label L, n may be the corresponding net in add_box. In the case of an input label L, the verification subsystem 104 can take the net in add_box that appears in the same input operand/column as specified for L. In the case of an output label L, the verification subsystem 104 can take the net in add_box that appears in the same column as specified for L. The verification subsystem 104 can then correlate L to n. For example, the verification subsystem 104 can record the correspondence between the synthesis signal L and the verification signal n using the label_to_net map. In some examples, verification subsystem 104 can check if L already appears in label_to_net, and, if this is the case, produce an error if label_to_net[L] !=n, and otherwise set label_to_net[L]=n.

Continuing the example, the matching ADD box in HDL-V may also have two operands of width 3 and one output of width 3, with input nets="a2", "a1", "a0" for the first operand, input nets "b2", "b1", "b0" for the second operand, and output nets "z2", "z1", "z0". Since the number of inputs, etc., matches in this example, the verification subsystem 104 may thus correlate the label "A2" to the net "a2", and so on.

In various examples, the Instance_SUBTRACT and Instance_MULTIPLY may be identical in syntax as Instance_ADD. In some examples, the Instance_MULTIPLY may additionally have a "type: SIGNED or UNSIGNED" field that may affect its semantics.

In various examples, the Instance_COMPARE may be more complicated because there are a variety of comparison types: greater-than, greater-than-or-equal-to, lesser-than, etc. For example, whether to define a separate AHoS 124 record for each comparison type versus to define a multiple-output generic record with a distinct output per comparison type may be predefined for a specific implementation. A multiple-output generic record with a distinct output per comparison type may be more-general. For example, to represent two distinct single-output arithmetic box with the same operands, two Instance_COMPAREs may be printed in the AHoS 124 with different output types populated. For example, the output type output_gt may be populated for "greater-than", and the output type output_ge may be populated for "greater-than-or-equal-to". An example of an Instance_COMPARE record type follows:

```
Instance_COMPARE
    record_name: Instance_COMPARE:1; box_name: COMP1
    operand1: A2 A1 A0; operand2: B2 B1 B0
    output_gt: GTL   # ">" comparison; output_ge:
    GEL   # ">=" comparison
    output_lt: LTL   # "<" comparison
    output_le: LEL   # "<=" comparison; output_eq:
    EQL   # "==" comparison
    output_ne: NEL   # "!=" comparison; END
``` where the '#' character may be used anywhere within the AHoS 124 to indicate a line comment, in which the remainder of the line is not processed.

In various examples, the basic record types of the AHoS 124 may further include Expand_MULTIPLY, Expand_COMPARE, Expand_SUBTRACT records. These records may be used to specify how synthesis converts respectively a given MULTIPLY, COMPARE, or SUBTRACT box into an ADD box, and may define the set of labels for new nets created by synthesis. Because the synthesis subsystem 102 may have flexibility in how to form compressors and carry-propagate logic from large multi-operand adders due to associative and commutative rewriting rules for addition, advanced early-arithmetic-synthesis may often attempt to form large multi-operand adders from adjacent arithmetic boxes of all types, then optimize those adders in various ways before choosing compressor and carry-propagate structures.

In various examples, the basic record types of the AHoS 124 may include an Expand_MULTIPLY record type. This record type may be used to indicate how a multiplier is converted into partial-products. For example, a multiplier defined in the previous Instance_MULTIPLY:2 record may correspond to: [Z5, Z4, Z3, Z2, Z1, Z0]=[A2, A1, A0]*[B2, B1, B0]. For simple "array" or "quadratic" partial-products expansion, the synthesis subsystem 102 may construct new gates Pij=AND(Ai, Bj); and replace the multiply box by an ADD box with: [Z5, Z4, Z3, Z2, Z1, Z0]=[0, P22, P21, P20, 0, 0]+[0, 0, P12, P11, P10, 0]+[0, 0, 0, P02, P01, P00]. In some examples, the synthesis subsystem 102 may specify the labels of these newly-created partial-product gates such as P00 for reference in later AHoS 124 records. These newly-created gates do not exist in HDL-V, motivating the distinction between "nets" and "labels". In various examples, the Expand_MULTIPLY record syntax may be as follows. An example Expand_MULTIPLY AHoS record is depicted below:

```
Expand_MULTIPLY
    record_name: Expand_MULTIPLY:3; refed_record:
    Instance_MULTIPLY:2
    expansion_type: array; multiplicand: operand1 # each bit
    of the "mutiplicand" operand is
        conjuncted with the entire vector of the other operand
    pp0: 0 P22 P21 P20 0  0; pp1: 0 0   P12 P11 P10 0; pp2:
    0 0   0   P02 P01 P00; END
```

In particular, the example shows an Expand_MULTIPLY record with record_name="Expand_MULTIPLY:3" that references a previously declared Instance_MULTIPLY:2 record containing the details for the actual multiplier box. For example, the details may include what the input and output labels are. In some examples, this Expand_MULTIPLY record may also specify the expansion_type dictating how the multiplier is expanded to partial products and the names of the resulting partial product labels, which may be referenced in later records. In various examples, the multiplier may be expanded using a simpler array expansion, also sometimes called quadratic expansion, or more complicated Booth expansion, among other types of expansion.

In various examples, the verification subsystem 104 can then replay Expand_MULTIPLY records. For example, the verification subsystem 104 can find the matching MULTIPLY box to: [z5, z4, z3, z2, z1, z0]=[a2, a1, a0]*[b2, b1, b0] in HDL-V by considering the referenced record of type Instance_MULTIPLY and taking the MULTIPLY box in HDL-V it was matched to. The verification subsystem 104 can then expand the MULTIPLY box into ADD boxes using the specified partial-product expansion type in the imported HDL-V netlist, creating new partial-product gates pij with the proper function. In some examples, for simpler array expansion, pij=AND(ai, bj). The verification subsystem 104 can then correlate Pij to pij.

In some examples, the basic record types of the AHoS 124 may include Expand_COMPARE records. The Expand_COMPARE record may be used to specify an expansion type, as there may be several different ways to translate the same COMPARE box into an ADD box, and the labels for the new nets representing the outputs of the ADD box. In some examples, only the label for the MSB output may be used because the other outputs may be disconnected. For example, based on the expansion type, a COMPARE box "Z=A>B" can be translated to any of the following: an ADDER X=A+~B, with Z=msb(X), denoted as expansion_type: EXPAND_GT, an ADDER X=A+~B+1, with Z=AND(msb(X), ~eq(A,B)), denoted as expansion_type: EXPAND_GE, an ADDER X=~A+B, with Z=AND(~msb(X), ~eq(A,B)), denoted as expansion_type: EXPAND_LT, or an adder X=~A+B+1, with Z=~msb(X), denoted as expansion_type: EXPAND_LE. In all these cases, the bitwidth of A and B is first extended by 1. The signal eq(A, B) represents logic that evaluates to 1 whenever A==B. The expansions for "Z=A<B", "Z=A>=B", "Z=A<=B" are similar. In various examples, the verification subsystem 104 can replay the Expand_COMPARE by constructing a similar ADD box in HDL-V based on expansion type, and correlating the MSB output of this box to the specified label. In various examples, a simple equality or non-equality may generally not be expanded into an adder. For example, "Z=A==B" and "Z=A!=B", may preferably be directly converted to bit-level logic. An example Expand_COMPARE record is shown below:

---

Expand_COMPARE
    record_name: Expand_COMPARE4; refed_record:
    Instance_COMPARE:1; expansion_type:
    EXPAND_GT; END

---

In some examples, the basic record types of the AHoS 124 may include Expand_SUBTRACT records. For example, an Expand_SUBTRACT record may simply convert "Z=A−B" to "Z=A+~B+1" and may not include any expansion type. An example Expand_COMPARE record is shown below:

---

Expand_SUBTRACT
    record_name: Expand_SUBTRACT:5; refed_record:
    Instance_SUBTRACT:1; END

---

In various examples, the basic record types of the AHoS 124 may also include Optimize_Column_Equivalence, Optimize_Column_Antivalence, Optimize_Row records. For example, an advanced arithmetic synthesis may employ multiple ADD box optimization techniques in order to reduce the number of outstanding net labels that act as inputs to the adder. The Optimize_Column_Equivalence, Optimize_Column_Antivalence, Optimize_Row records may allow to specify these reductions. For example, the Optimize_Column_Equivalence record may specify that reduction $<Z, k>+<Z, k>=<Z, k+1>$. An example Optimize_Column_Equivalence record is shown below:

---

Optimize_Column_Equivalence
record_name: OPT_COL_EQUIV:6; refed_record: Coalesce_ADD:1
column: 2 # strand of consumed inputs. Output Z will be inserted
at column+1
input: Z # label Z must be available twice to be summed in this
column; END

---

The verification subsystem 104 can replay this example Optimize_Column_Equivalence record by first finding the matching ADD box in HDL-V. The verification subsystem 104 can then set z=label_to_net[Z], and produce an error if Z is not in the label_to_net map. In some examples, the verification subsystem 104 can also verify that the matching ADD box has two copies of z in column 2, and produce an error otherwise. The verification subsystem 104 can then remove two copies of z in column 2. In some examples, if the adder has column 3, the verification subsystem 104 can insert a single copy of z in column 3. If the adder has width 3, the verification subsystem 104 can remove two copies of z in column 2.

In various examples, the basic record types of the AHoS 124 may also include an Optimize_Column_Antivalence record. For example, the Optimize_Column_Antivalence record may be used to specify the reduction $<Z, k>+<~Z, k>=<"1", k+1>$. An example Optimize_Column_Antivalence record is shown below:

---

Optimize_Column_Antivalence
record_name: OPT_COL_ANTIV:7; refed_record: Coalesce_ADD:1
column: 3 # strand of consumed inputs. Output "1" will be
inserted at column+1
input: Z # label Z must be available once uninverted, and once inverted,
to be summed in this
column; END

---

In various examples, the basic record types of the AHoS 124 may also include an Optimize_Row record. For example, the Optimize_Row record may be used to specify the reduction of the form $<Z, j>+<Z, j+1>+ \ldots +<Z, k>=<Z, k+1>−<Z, j>$, where $j<k$. As one example, for $j=2$, $k=5$: $<Z, 2>+<Z, 3>+<Z, 4>, <Z, 5>=<Z, 6>−<Z, 2>$. For example, the synthesis tool may specify an Optimize_Column_Equivalence record with record_name="Optimize_Column_Equivalence: 4" that refers to a previously declared or constructed ADD box with two copies of the gate "Z" in column 2, and perform the optimization that replaces $<Z, 2>+<Z, 2>=<Z, 3>$. An example Optimize_Column_Antivalence record is shown below:

---

Optimize_Row
record_name: OPT_ROW:8; refed_record: Coalesce_ADD:1
column: 2 3 4 5 # each columns having a common input label to
be optimized
input: Z # label Z must be available once uninverted in each
column; END

---

In some examples, the basic record types of the AHoS 124 may include Coalesce_ADD records. For example, as described above, advanced synthesis techniques may coalesce adjacent adders into one larger multi-operand adder. A Coalesce_ADD record may thus indicate a pair of mutually-optimized Instance_ADD or Create_ADD or Create_Compressor records, previously-declared Coalesce_ADD or Extend_ADD records, Expand_MULTIPLY, Expand_COMPARE and Expand_SUBTRACT records, or any combination thereof. In various examples, a Coalesce_ADD record cannot refer directly to Instance_MULTIPLY records. Therefore, the verification subsystem 104 can determine what type of partial-products expansion was used during synthesis, and what the names (labels) of the corresponding partial-products bits are, as indicated in Expand_MULTIPLY. In various examples, when more than two adjacent adders are to be coalesced, several Coalesce_ADD records can be used to specify the multi-operand adder that coalesces the given adders. A single Coalesce_ADD record allows the synthesis subsystem 102 to record the specific choices required to unequivocally coalesce two adders: the parent and the child ADD boxes being coalesced, alignment of the child box relative to the parent, whether the child box's outputs should be inverted, etc. As one example, given a "parent" ADD box: [W2, W1, W0]=[U2, U1, U0]+[Z2, Z1, Z0] and a "child" ADD box: [Z2, Z1, Z0]=[A2, A1, A0]+[B2, B1, B0], the synthesis subsystem 102 may rewrite the parent box or create a new box as [W2, W1, W0]=[U2, U1, U0]+[A2, A1, A0]+[B2, B1, B0]. In this case, the Coalesce_ADD record may specify the parent box (or, more precisely, the previous record that defines or constructs such a box), the child box, and how these boxes are coalesced. In the specific example, no alignment or inversion is needed. An example corresponding AHoS record may thus be:

```
Coalesce_ADD
    record_name: Multi_ADD:1
    refed_record: Instance_ADD:3(Instance_ADD:1,
    Expand_Multiply:3); END
```

In various examples, one or more refed_record's may be applicable to a Coalesce_ADD record. The syntax of this field may list them all, along with relative information about parent and child nesting. The output labels of the first-referenced record outside parenthesis may be inherited by the Coalesce_ADD record. Continuing with the above example, the verification subsystem 104 can replay this record by first finding a matching parent ADD box p_add in HDL-V: [w2, w1, w0]=[u2, u1, u0]+[z2, z1, z0]. The verification subsystem 104 can then find a matching child ADD box c_add in HDL-V: [z2, z1, z0]=[a2, a1, a0]+[b2, b1, b0]. The verification subsystem 104 can then also verify that the c_add and p_add have the same width. In general, Extend_ADD records may be previously used to ensure compatible width. The verification subsystem 104 can further verify that the outputs of c_add are contained in the inputs of p_add in the corresponding columns. The verification subsystem 104 can then create a new ADD box representing the result of coalescing p_add and c_add, which represents: [w2, w1, w0]=[u2, u1, u0]+[a2, a1, a0]+[b2, b1, b0]. In various examples, different extensions of such adder coalescing technique may be treated similarly, with the verification subsystem 104 performing the specified coalescing of the specified parent and child adders in HDL-V. For example, the coalescing may be executed based on the widths of the parent and the child adders, specified alignment and inversion, etc.

In some examples, the basic record types of the AHoS 124 may include Create_Compressor and Create_ADD records. For example, when implementing a multi-operand ADD box, the synthesis subsystem 102 may typically create a very large number of 1-bit-wide half- or full-adders, also referred to as 2:2 compressors and 3:2 compressors. In various examples, larger compressors may also be supported. However, for ease of explanation, only 3:2 and 2:2 compressors are discussed herein because larger compressors may be decomposed into these forms. In various examples, the Create_Compressor record may specify the ADD box being partially implemented, which input labels are consumed, and the column containing these inputs. Additionally, the Create_Compressor record may specify the labels of the newly created "sum" and "carry" nets, which may be referenced in later records. As one example, an example adder being implemented may be: [Z2, Z1, Z0]=[A2, A1, A0]+[B2, B1, B0]+[C2, C1, C0]+[D2, D1, D0], and the synthesis subsystem 102 may create a full-adder that consumes inputs A1, B1 and D1 and column 1, with the "sum" output P and the "carry" output Q. In some examples, the synthesis subsystem 102 may rewrite the above adder as: [Z2, Z1, Z0]=[A2, 0, A0]+[B2, 0, B0]+[C2, C1, C0]+[D2, 0, D0]+[Q, P, 0]. The corresponding example AHoS record may thus be:

```
Create_Compressor
    record_name: Create_Compressor:9
    box_name: # optional field reflecting newly-created box name,
    only existing in downstream
synthesis
    refed_record: Multi_ADD:1 # name of Create_ADD or Expand_Multiply
    record(s) being
"implemented"
    column: 1 # input labels must be available to be summed in this column; input: A1 B1 D1
    sum_output: P # label inserted into column; carry_output: Q # label inserted into Q; END
```

In various examples, the verification subsystem 104 can replay this record by first identifying the relevant ADD box in HDL-V. The verification subsystem 104 can then find HDL-V nets that correspond to the labels of "consumed" inputs, using label_to_net, and report an error in response to detecting that these labels are not available to be summed in the specified column. The verification subsystem 104 can then create a matching half- or full-adder in HDL-V, with "sum" output p and "carry" output q. The verification subsystem 104 may then correlate P with p, and Q with q. Finally, the verification subsystem 104 can remove consumed inputs from the ADD box in the specified column, while injecting p to column k, and q to column k+1. However, there may be no need to inject q when k+1 exceeds the width of the adder.

In various examples, the Create_ADD record may be a vectored generalization of Create_Compressor that allows to specify an arbitrary set of inputs being consumed across multiple columns. Create_ADD and Clone_Box may also be used to represent subexpression elimination during synthesis. In various examples, it may be assumed that the width of a Create_ADD mentions that of the refed_record, and thus column need not be specified. In some examples, this can be generalized to refer to a subset of the width of the refed_record by indicating starting column. If a Create_ADD is used to represent the remaining 2-operand adder (with possible $3^{rd}$ "carry" operand) after a possible set of Create_Compressor records, an error may be issued if the output labels do not match those of the corresponding refed_record. If instead Create_Compressors are used to fully-implement a Coalesce_ADD, then the final sum_output per column may match the output labels of the corresponding refed_record. An example Create_ADD record is shown as follows:

```
Create_ADD
    record_name: Create_ADD:10
    box_name: # optional field reflecting newly-created box name,
    only existing in downstream
synthesis
    refed_record: Create_ADD:1; operand1: U2 U1 U0; operand2:
    Z2 Z1 Z0; output: W2 W1 W0
END
```

In some examples, the basic record types of the AHoS 124 may include Extend_ADD records. In some examples, the synthesis subsystem 102 may sometimes extend the width of an ADD box. For example, the ADD box may correspond to a previously-declared Instance_ADD, Create_ADD, Create_Compressor, Coalesce_ADD, Expand_Compare, Expand_SUBTRACT, or Expand_MULTIPLY record. As one example, this may occur when accessing a carry_out value of to ADD boxes compared via <, <=, >, or >=, or generally when describing how different-width parent and child ADD boxes are coalesced together. In various examples, the Extend_ADD record may be used to record such transforms, providing the extra most-significant output label's which may appear in later records. In some examples, the Extend_ADD record may include an extension type field, of either EXTEND_ZERO signifying padding 0's on newly-introduced inputs, or EXTEND_SIGN to sign-extend newly-introduced inputs. As one specific example, a child box Instance_ADD: 20 is [Z2 Z1 Z0]=[A2 A1 A0]+[B2 B1 B0], and the parent box that the synthesis subsystem 102 creates a Coalesce ADD for is [W3 W2 W1 W0]=[U3 U2 U1 U0]+[Z3 Z2 Z1 Z0]. To perform the coalescing, the child box may be extended by one bit. Given a new output label be T, then the corresponding AHoS 124 record may appear as follows:

```
Extend_ADD
    record_name: Extend_ADD:11; refed_record: Instance_ADD:20;
    extension_type:
EXTEND_ZERO; new_outputs: T; END
```

In various examples, the verification subsystem 104 can replay this record by first identifying the relevant ADD box in HDL-V. The verification subsystem 104 can then extend the width of this box by the specified amount, creating new nets for newly introduced outputs. The verification subsystem 104 can then further correlate specified labels with newly created output nets.

In some examples, the basic record types of the AHoS 124 may include Declare_Net_Redundancy and Declare_Net_Remap records. For example, Declare_Net_* records may be used to record newly-discovered redundancies among already declared net_labels, and to declare new net label "aliases" for previously-declared net labels. The Declare_Net_Redundancy record can be used to indicate functional redundancies among net_label's. Those functional redundancies may enable more aggressive synthesis. For example, the functional redundancies may enable the application of Optimize_Column or Optimize_Row records. In various examples, the verification subsystem 104 may prove all declared redundancies before they can be safely replayed, and issue an error message in response to detecting that this proof fails. For example, every net label appearing in a Declare_Net_Redundancy record may be verified to appear in previous records. An example Declare_Net_Redundancy record may thus appear as:

```
Declare_Net_Redundancy
    record_name: Declare_Net_Red:12
    labels: A ~B C # label A is equivalent to C; A and C are
    both antivalent to B
END
```

In various examples, the verification subsystem 104 may replay the Declare_Net_Redundancy record. For example, given a pair L0, L1 of specified labels, the verification subsystem 104 may first identify corresponding nets n0, n1 in HDL-V. In particular, the verification subsystem 104 may set n0=label_to_net[n0], n1=label_to_net[n1]. The verification subsystem 104 can then apply a light-weight proof technique to check if n0 and n1 are indeed equivalent, and produce an error in response to detecting that the equivalence cannot be proved or is incorrect. The verification subsystem 104 can then merge n1 to n0 in HDL-V.

In various examples, the Declare_Net_Remap can be used to declare an alias for a previously declared label of a net. For example, the Declare_Net_Remap record contains the new label L_new that "alias" to an old label L_old. An example Declare_Net_Remap record may thus appear as:

```
Declare_Net_Remap
    record_name: Declare_Net_Remap:13; hos_name:
    L_old; new_name: L_new; END
```

In various examples, the verification subsystem 104 may replay the Replaying Declare_Net_Remap by first verifying that L_new is not in label_to_net. Otherwise, the verification subsystem 104 can report an error. The verification subsystem 104 can then set n=label_to_net[L_old] be the net in HDL-V corresponding to L_old. The verification subsystem 104 can then also set label_to_net[L_new]=n.

In some examples, the basic record types of the AHoS 124 may also include box rename records. For example, a Declare_Box_Remap record may be used with renaming that may occur during early synthesis, or to possibly cope with different arithmetic box names in HDL-V and HDL-S. The Declare_Box_Remap record specifies the old and the new name of arithmetic box. For example, the names may be BOX_old and BOX_new, as shown in the example Declare_Box_Remap_record below:

---

Declare_Box_Remap
   record_name: Declare_Box_Remap:14; hos_name:
   BOX_old; new_name: BOX_new; END

---

In various examples, the verification subsystem 104 may replay the Declare_Box_Remap record by updating the 1:1 correlation between HDL-S and HDL-V names.

In various examples, the basic record types of the AHoS 124 may also include various merge records. For example, such merge records may include Merge_ADD, Merge_SUB-TRACT, Merge_COMPARE, and Merge_MULTIPLY records. These Merge_* records reflect merges of functionally-redundant boxes performed during synthesis. In various examples, the merged boxes are of the same type. For example, both boxes may be ADD boxes, SUBTRACT boxes, MULTIPLY boxes, or COMPARE boxes. In some examples, both boxes may have the same width, same number of inputs, and identical inputs. In some examples, the boxes may be identical modulo simple equivalences, such as "Z=X*Y" is equivalent to "W=Y*X", and "S=<Y" is equivalent to "T=X>=Y". The verification subsystem 104 may replay Merge_* records by first identifying the boxes being merged in HDL-V, and denoting these by box1 and box2. The verification subsystem 104 can then verify that box1 and box2 have same type, same width, same number of operands, same inputs (modulo simple equivalences), or that the narrower of box1 vs box2 has the same number of operand and the same least-significant inputs up to that narrower width. Otherwise, the verification subsystem 104 may report an error. The verification subsystem 104 can then merge the outputs of box1 onto the outputs of box2. In some examples, if an output n1 of box1 is not disconnected, while the corresponding output n2 of box2 is disconnected, merging n1 onto n2 may include transferring n1 to be the output of box2 instead of box1. In various examples, to avoid ambiguity, a Merge_Box record may indicate which record's box will persist after the merge, and which will no longer be referenced. An example Merge_Box record may thus appear as:

---

Merge_Box
   record_name: Merge_Box:15; persistent_record:
   Coalesce_ADD:21; deleted_record:
   Coalesce_ADD:22; END

---

When merging a narrower ADD box onto least-significant bits of a wider ADD box, the wider box may be persistent and the narrowed box may be deleted. For example, given [Z2, Z1, Z0]=[A2, A1, A0]+[B2, B1, B0] and [W1, W0]= [A1, A0]+[B1, B0], the verification subsystem 104 may merge the outputs W1 and W0 onto Z1 and Z0 respectively, and delete the box [W1, W0]=[A1, A0]+[B1, B0]. In various examples, Extend ADD may be used to fine tune this merge. Replaying this record in EC merely merges the corresponding n-th output of the deleted_record onto the n-th output of persistent_record, or populating the latter with the former if the latter is disconnected, as may be indicated by a '*'.

In various examples, the basic record types of the AHoS 124 may also further include various box cloning records. For example, a Clone_Box record may be used when the synthesis subsystem 102 creates a copy of an existing box. For example, the synthesis subsystem 102 may create a copy of an existing box because that box has two or more sinks that are to be fabricated in different locations of a chip, and it may be desired to connect those fanouts to topologically-nearer sources. In various examples, a new box and new output net labels are created when cloning. The input nets may be precisely inherited from a refed_record. An example Clone_Box record may thus appear as below:

---

Clone_Box
   record_name: Clone_ADD:16; refed_record: Instance_ADD:1
   box_name: optional field reflecting newly-created box name,
   only existing in downstream
   synthesis; outputs: NEWOUT2 NEWOUT1 NEWOUT0; END

---

In various examples, verification subsystem 104 may replay the Clone_Box by first identifying the box being cloned in HDL-V. The verification subsystem 104 may then denote this box by box1. The verification subsystem 104 may then create a new box with the same width and inputs as box1, and with new output nets. The verification subsystem 104 can then correlate specified output labels with newly created nets. Finally, the verification subsystem 104 may then use the specified name for the new box to update the 1:1 correlation between boxes in HDL-S and HDL-V.

As one specific example of a detailed synthesis flow and corresponding generated AHoS 124, the synthesis subsystem 102 may process a fused multiply-add: A*B+C. For example, the received HDL 118 may include the arithmetic expression Z<=A*B+C, where "<=" represents the "assignment" of Z to "A*B+C" and A and B are bit vectors of width 4, and C and Z are bit vectors of width 8. In the above expression, Z is obtained by first multiplying A by B, and then C is added to the result. The high-level design (HDL-V, HDL-S) may contain two arithmetic boxes: a MULTIPLY box computing T<=A*B, and an ADD box computing Z<=T+C. The AHoS 124 may contain an Instance_MUL-TIPLY record declaring T, specifying the net_labels of its inputs and outputs. For example, the first operand may include net_labels [A(3), A(2), A(1), A(0)], the second operand may include net_labels [B(3), B(2), B(1), B(0)], and the output may include net_labels [NET3, NET4, NET5, NET6, NET7, NET8, NET9, NET10]. The AHoS 124 may also contain an Instance_ADD record describing Z. For example, the first operand may include net_labels [NET3, NET4, NET5, NET6, NET7, NET8, NET9, NET10], the second operand may include net_labels [C(7), C(6), C(5), C(4), C(3), C(2), C(1), C(0)], and the outputs may include net_labels [Z(7), Z(6), Z(5), Z(4), Z(3), Z(2), Z(1), Z(0)]. The synthesis subsystem 102 can convert the MULTIPLY box into an ADD box by using an expansion to partial products. The AHoS 124 may reflect this via an Expand_MULTIPLY record that refers to the MULTIPLY box from the Instance_MULTIPLY record and may specify the net_labels of the created partial product nets. The synthesis subsystem 102 can then coalesce the adder from the Instance_ADD record and the adder from the Expand_MULTIPLY record, replacing the ADD box in the Instance_ADD record by an ADD box with the output net_labels [Z(7), Z(6), Z(5), Z(4), Z(3), Z(2), Z(1), Z(0)], and input net_labels including [C(7), C(6), C(5), C(4), C(3), C(2), C(1), C(0)] and the "partial products" net_labels created previously. The AHoS 124 may reflect this by specifying a Coalesce ADD record that references ADD boxes from the Instance_ADD record and the Expand_MULTIPLY record, specifying how exactly they are coalesced. The synthesis subsystem 102 can then create a sequence of 1-bit-wide full- and half-adders to implement the coalesced ADD box. For each such full- and half-adder, in the given order, the AHoS 124 may have a Create_Compressor record that refers to the coalesced ADD box and specifies net_labels for the consumed inputs and the net_la- Continuing the above detailed example, during EC checking HDL-V against the bit-level design produced after the synthesis described above and arbitrary late-synthesis transforms, the verification subsystem 104 may replay the above synthesis using the AHoS 124 information while expanding imported HDL-V arithmetic expressions in a trusted correct-by-construction way. The verification subsystem 104 may then use existing arbitrary EC verification algorithms that would be used even if sophisticated early-arithmetic-synthesis were not performed. This AHoS-guided expansion of HDL-V ensures that many internal equivalences will exist with BSD, thus boosting EC scalability. Thereafter, the EC 114 may be as scalable as if sophisticated early-arithmetic-synthesis were not performed. An example overall AHoS file 124 for the above detailed example is the following:

```
Instance_MULTIPLY; record_name: Instance_MULT:1; box_name: MULT1; type: UNSIGNED
    operand1: A(3) A(2) A(1) A(0); operand2: B(3) B(2) B(1) B(0)
    output: NET3 NET4 NET5 NET6 NET7 NET8 NET9 NET10; END
Instance_ADD; record_name: Instance_ADD:2; box_name: ADD1
    operand1: NET3 NET4 NET5 NET6 NET7 NET8 NET9 NET10
    operand2: C(7) C(6) C(5) C(4) C(3) C(2) C(1) C(0)
    output: Z(7) Z(6) Z(5) Z(4) Z(3) Z(2) Z(1) Z(0); END
Expand_MULTIPLY; record_name: Expand_MULT:3; refed_record: Instance_MULT:1
    EXPANSION_TYPE: ARRAY
    MULTIPLICAND: operand1; pp0: 0 P33 P32 P31 P30 0 0 0
    pp1: 0 0 P23 P22 P21 P20 0 0; pp2: 0 0 0 P13 P12 P11 P10 0
    pp3: 0 0 0 0 P03 P02 P01 P00; END
Coalesce_ADD; record_name: Coalesce_ADD:4
    refed_record: Instance_ADD:2(Expand_MULT:3); END
Create_Compressor; record_name: COMP:4c1; refed_record: Coalesce_ADD:4; column: 1
    input: P10 P01; sum_output: OUT1; carry_output: cOUT2; END
Create_Compressor; record_name: COMP:4c2; refed_record: Coalesce_ADD:4; column: 2
    input: P20 P11 P02; sum_output OUT2; carry_output: cOUT3; END
Create_Compressor; record_name: COMP:4c2b; refed_record: Coalesce_ADD:4; column: 2
    input: cOUT2 OUT2; sum_output: OUT2b; carry_output: cOUT3b; END
Create_Compressor; record_name: COMP:4c3; refed_record: Coalesce_ADD:4; column: 3
    input: P30 P21 P12; sum_output: OUT3; carry_output: cOUT4; END
Create_Compressor; record_name: COMP:4c3b; refed_record: Coalesce_ADD:4; column: 3
    input: P03 OUT3 cOUT3b; sum_output: OUT3b; carry_output: cOUT4b; END
Create_Compressor; record_name: COMP:4c3c; refed_record: Coalesce_ADD:4; column: 3
    input: cOUT3 OUT3b; sum_output: OUT3c; carry_output: cOUT4c; END
Create_Compressor; record_name: COMP:4c4; refed_record: Coalesce_ADD:4; column: 4
    input: P31 P22 P13; sum_output: OUT4; carry_output: cOUT5; END
Create_Compressor; record_name: COMP:4c4b; refed_record: Coalesce_ADD:4; column: 4
    input: cOUT4 cOUT4b cOUT4c; sum_output: OUT4b; carry_output: cOUT5b; END
Create_Compressor; record_name: COMP:4c4c; refed_record: Coalesce_ADD:4; column: 4
    input: OUT4 OUT4b; sum_output: OUT4c; carry_output: cOUT5c; END
Create_Compressor; record_name: COMP:4c5; refed_record: Coalesce_ADD:4; column: 5
    input: P32 P23 cOUT5; sum_output: OUT5; carry_output: cOUT6; END
Create_Compressor; record_name: COMP:4c5b; refed_record: Coalesce_ADD:4; column: 5
    input: cOUT5b OUT5 cOUT5c; sum_output: OUT5b; carry_output: cOUT6b; END
Create_Compressor; record_name: COMP:4c6; refed_record: Coalesce_ADD:4; column: 5
    input: P33 cOUT6 cOUT6b; sum_output: OUT6; carry_output: cOUT7; END
Create_ADD; record_name: CADD:8; refed_record: Coalesce_ADD:4
    operand1:0 OUT6 OUT5b OUT4c OUT3c OUT2b OUT1 P00
    operand2: C(7) C(6) C(5) C(4) C(3) C(2) C(1) C(0)
    output: Z(7) Z(6) Z(5) Z(4) Z(3) Z(2) Z(1) Z(0); END
``` bels for the newly created "sum" and "carry" outputs. In some examples, that outputs of prior Create_Compressor records may be inputs to future Create_Compressor records. In various examples, the synthesis subsystem 102 can produce many Create_Compressor records, adequate to sum each bit of the ADD box. The synthesis subsystem 102 may leave one or more vectored 2-operand adder to synthesize using sophisticated carry-propagate logic. For example, the synthesis subsystem 102 can synthesize the one or more vectored 2-operand adder using an automated synthesis of high-performance two operand binary parallel prefix adder technique. This synthesis may be reflected in AHoS 124 via Create ADD records.

As a second detailed example of a synthesis flow and corresponding generated AHoS 124, the synthesis subsystem 102 may process an inequality, where the HDL 118 includes the arithmetic expression $Z<=(A+B)>C$, where A, B, C are bit vectors of width 4, and Z is a 1-bit-wide output. In this example, the AHoS 124 may include an Instance_ADD record representing $T<=A+B$. For example, this may appear as: [T3, T2, T1, T0]=[A3, A2, A1, A0]+[B3, B2, B1, B0]. In addition, the AHoS 124 may contain an Instance_COMPARE record representing $Z<=T>C$. The synthesis subsystem 102 may replace the COMPARE box from the Instance_COMPARE record by the following equivalent ADD box: [Z, *, *, *, *,]=[0, T3, T2, T1, T0]+[0, ~C3, ~C2, ~C1, ~C0]. The AHoS 124 reflects this using a suitable Expand_COMPARE record. The synthesis subsystem 102 may then coalesce the ADD boxes from the Instance_ADD and Expand_COMPARE records. The correct procedure may include introducing a "sum truncation" bit for the ADD box in the Instance_ADD record, creating a new signal T4 and replacing the first ADD box by: [T4, T3, T2, T1, T0]=[0, A3, A2, A1, A0]+[0, B3, B2, B1, B0]. The AHoS 124 may reflect this coalescing using an Extend ADD record that refers to the ADD box from the Instance_ADD record and specifies the new net labels created (here, T4). Now, the synthesis subsystem 102 can actually coalesce the ADD boxes for: [Z, *, *, *, *]=[0, T3, T2, T1, T0]+[0, ~C3, ~C2, ~C1, ~C0] and for [T4 T3 T2 T1 T0]=[0, A3, A2, A1, A0]+[0, B3, B2, B1, B0], replacing the former box with: [Z, *, *, *, *]=[0, A3, A2, A1, A0]+[0, B3, B2, B1, B0]+[0,~C3, ~C2, ~C1, ~C0]+[~T4, 0, 0, 0, 0]+[1, 0, 0, 0, 0]. The AHoS 124 may reflect this step using a Coalesce_ADD record. Thus, a single step in synthesis may be reflected by several records in the AHoS 124. The synthesis subsystem 102 may now implement the resulting ADD box using a sequence of 1-bit-wide full- and half-adders, and AHoS 124 may reflect this via Create_Compressor records. Optionally, if a vectored 2-operand adder remains after bit-level compressor insertion, the synthesis subsystem 102 may use a Create_ADD record. A resulting overall AHoS 124 file for this second detailed example is the following:

```
Instance_ADD; record_name: Instance_ADD:1; box_name: ADDER1
  operand1: A(3) A(2) A(1) A(0); operand2: B(3) B(2) B(1) B(0); output: NET5 NET4 NET3
  NET2
  END
Instance_COMPARE; record_name: Instance_COMPARE:2; box_name: GR_THN1
  operand1: NET5 NET4 NET3 NET2; operand: C(3) C(2) C(1) C(0); OUTPUT_GT: Z(0);
  END
Expand_Compare; record_name: Expand_COMPARE:3; refed_record: Instance_COMPARE:2
  expansion_type: COMPARE_GT; END
Extend_ADD; record_name: Extend_ADD:4; refed_record: Instance_ADD:1
  outputs: * * * * ADDER1_SUM_4; extension_type: EXTEND_ZERO; END
Coalesce_ADD; record_name: Coalesce_ADD:5
  refed_record: Expand_COMPARE:3(Extend_ADD:4); END
Create_Compressor; record_name: Create_Compressor:6; refed_record: Coalesce_ADD:5
  column: 1; input: B(1) A(1); output: NET_14_SUM_0 NET_14_COUT_0; END
Create_Compressor; record_name: Create_Compressor:7; refed_record: Coalece_ADD:5
  column: 2; input: B(2) A(2) ~C(2); output: NET_15_SUM_0 NET_15_COUT_0; END
Create_Compressor:8; record_name: Create_Compressor:8; refed_record: Coalesce_ADD:5
  column: 3; input: B(3) A(3) ~C(3); output: NET_16_SUM_0 NET_16_COUT_0; END
Create_Compressor:9; record_name: Create_Compressor:9; refed_record: Coalesce_ADD:5
  column: 4; input: ~ADDER1_SUM_4 1; output: NET_17_SUM_0 NET_17_COUT_0; END
Create_ADD:10; record_name: Create_ADD: 10; refed_record: Coalesce_ADD:5
  operand1: NET_17_COUT_0 NET_16_COUT_0 NET_15_COUT_0 NET_14_COUT_0
  NET_14_SUM_0 ~C(0)
  operand2: 0 NET_17_SUM_0 NET_16_SUM_0 NET_15_SUM_0 ~C(1) A(0)
  operand3: 0 0 0 0 0 B(0); output: Z(0) * * * * *; END
```

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional client devices, or additional resource servers, etc.). For example, in some embodiments, the verification subsystem 104 may further include a formal verification tool communicatively coupled to the equivalence checker 114. Furthermore, in some embodiments, the early transforms executer 106 may be excluded.

Figure 2:
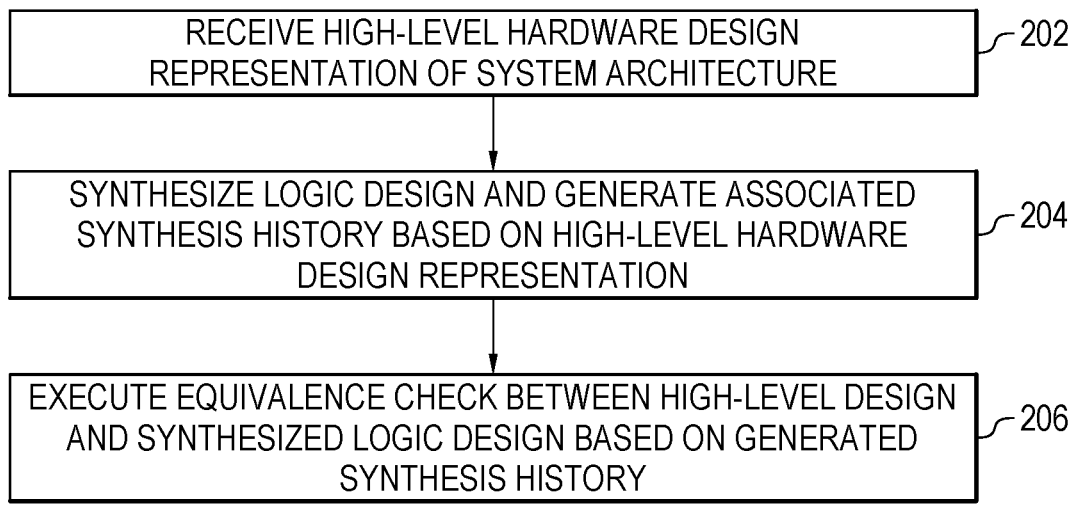
FIG. 2 is a process flow diagram of an example method that can perform equivalence checking using a synthesis history.

FIG. 2 is a process flow diagram of an example method that can perform equivalence checking using a synthesis history. The method 200 can be implemented with any suitable computing device, such as the computing device 500 of FIG. 5 and is described with reference to the system 100 of FIG. 1. For example, the methods described below can be implemented by the processor 502 or the processor 802 of FIGS. 5 and 8.

At block 202, a processor receives a high-level design representation of a system architecture. For example, the high-level design representation may be in the form of a hardware design language (HDL). In various examples, the HDL may be compiled or translated to the form of HDL-V and HDL-S. For example, the HDL-V and HDL-S may be translated for use as inputs for the synthesis system and verification system, respectively, and may each include a design with vectored arithmetic boxes.

At block 204, the processor synthesizes a logic design and generates an associated synthesis history based on the high-level hardware design representation. For example, the synthesized logic design may be a BSD including a gate-level netlist. In some examples, the gate-level netlist may be instrumented with the associated synthesis history. In various examples, the synthesis history may be stored in an arithmetic-history-of-synthesis file as described herein. In some examples, the processor generates and stores an arithmetic synthesis history during an early synthesis and optimization of arithmetic primitives of the high-level design representation.

At block 206, the processor executes an equivalence check between a high-level design and a synthesized logic design based on the generated synthesis history. For example, the processor can replay the high-level design using synthesis history to generate a bit-level design (BVD) representation used for the equivalence check. The bit-level design representation is referred to as BVD. In various examples, the processor can compare the synthesized logic design to a generated bit-level design (BVD), where the synthesized logic design includes a bit-level post-synthesis gate-level logic (BSD) netlist.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, the method 200 may include any of the operations described in the methods 300 and 400 of FIGS. 3 and 4.

Figure 3:
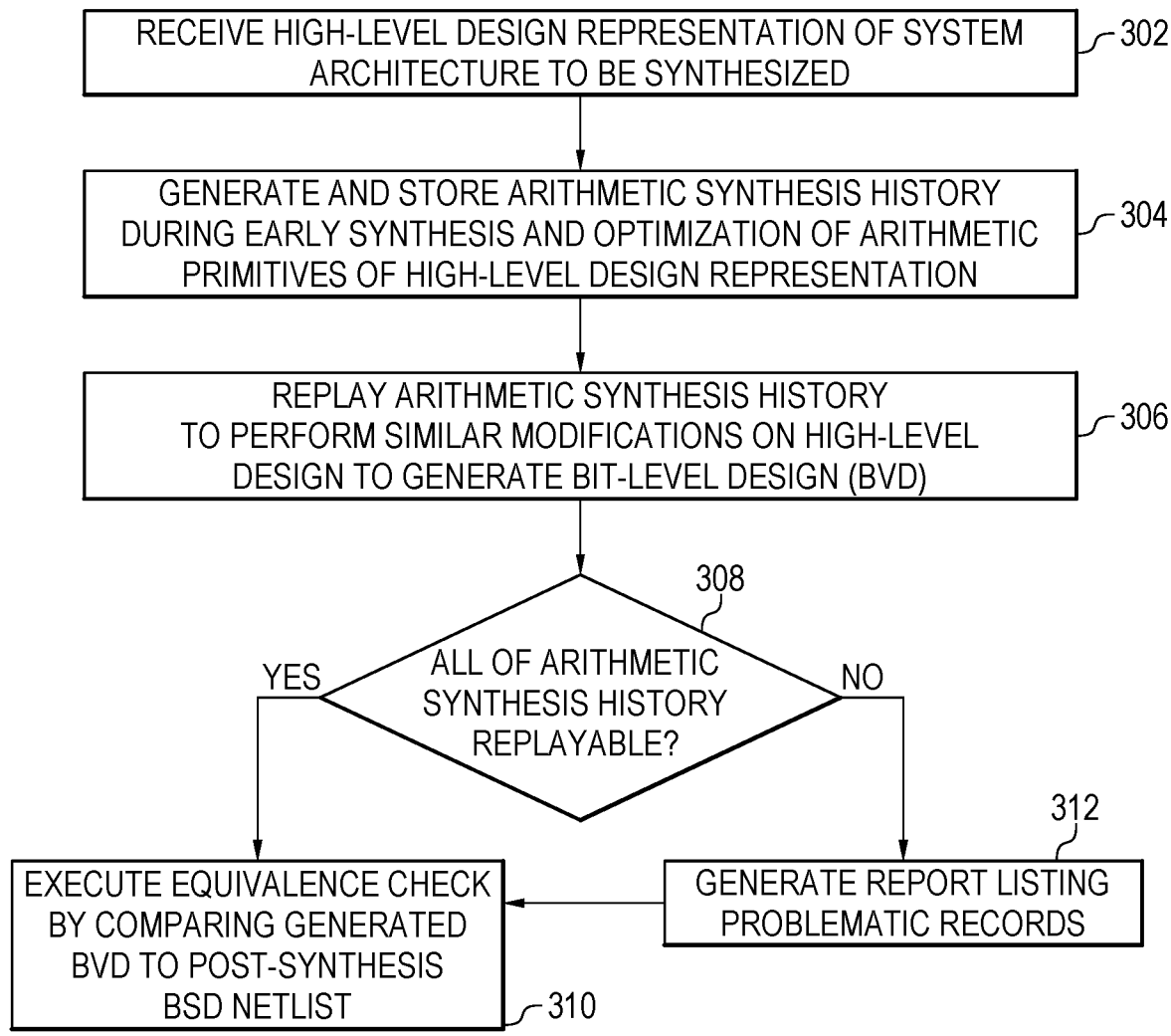
FIG. 3 is a detailed process flow diagram of another example method that can perform equivalence checking using a synthesis history.

FIG. 3 is a detailed process flow diagram of another example method that can perform equivalence checking using a synthesis history. The method 300 can be implemented with any suitable computing device, such as the computing device 500 of FIG. 5 and is described with reference to the system 100 of FIG. 1. For example, the methods described below can be implemented by the processor 502 or the processor 802 of FIGS. 5 and 8.

At block 302, a processor receives a high-level design representation of a system architecture to be synthesized. For example, the high level design representation may be received in the translated forms of an HDL-V and HDL-S.

At block 304, the processor generates and stores an arithmetic synthesis history during early synthesis and optimization of arithmetic primitives of the high-level design representation. For example, the arithmetic synthesis history may be stored in an external file, referred to herein as an arithmetic-synthesis-of-history.

At block 306, the processor replays the arithmetic synthesis history to perform similar modifications on the high-level design to generate a bit-level design (BVD). For example, the processor can process each record in the arithmetic synthesis history based on record type. In various examples, the modifications may be arithmetic optimizations. In various examples, the high-level design may contain vectored arithmetic boxes. The generated BVD may only contain Boolean logic.

At decision diamond 308, the processor determines whether all of the arithmetic synthesis history is replayable. For example, the arithmetic synthesis history is replayable if the verification system can follow the AHoS guidance without obtaining an error. This means that the verification subsystem can perform correct-by-construction transforms corresponding to the given arithmetic history of synthesis records. If all of the arithmetic synthesis history is replayable, then the method may continue at block 310. If not all of the arithmetic synthesis history is replayable, then the method may continue at block 312.

At block 310, the processor executes an equivalence check by comparing the generated BVD to a post-synthesis BSD netlist. For example, the processor can compare the BSD synthesized logic design to the generated bit-level design (BVD). For example, the synthesized logic design includes a bit-level post-synthesis gate-level logic (BSD) netlist.

At block 312, the processor generates a report listing problematic records. For example, the problematic records may have caused at least some of the arithmetic synthesis history to not be replayable.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, the method 300 may include any of the blocks of method 400 below.

Figure 4:
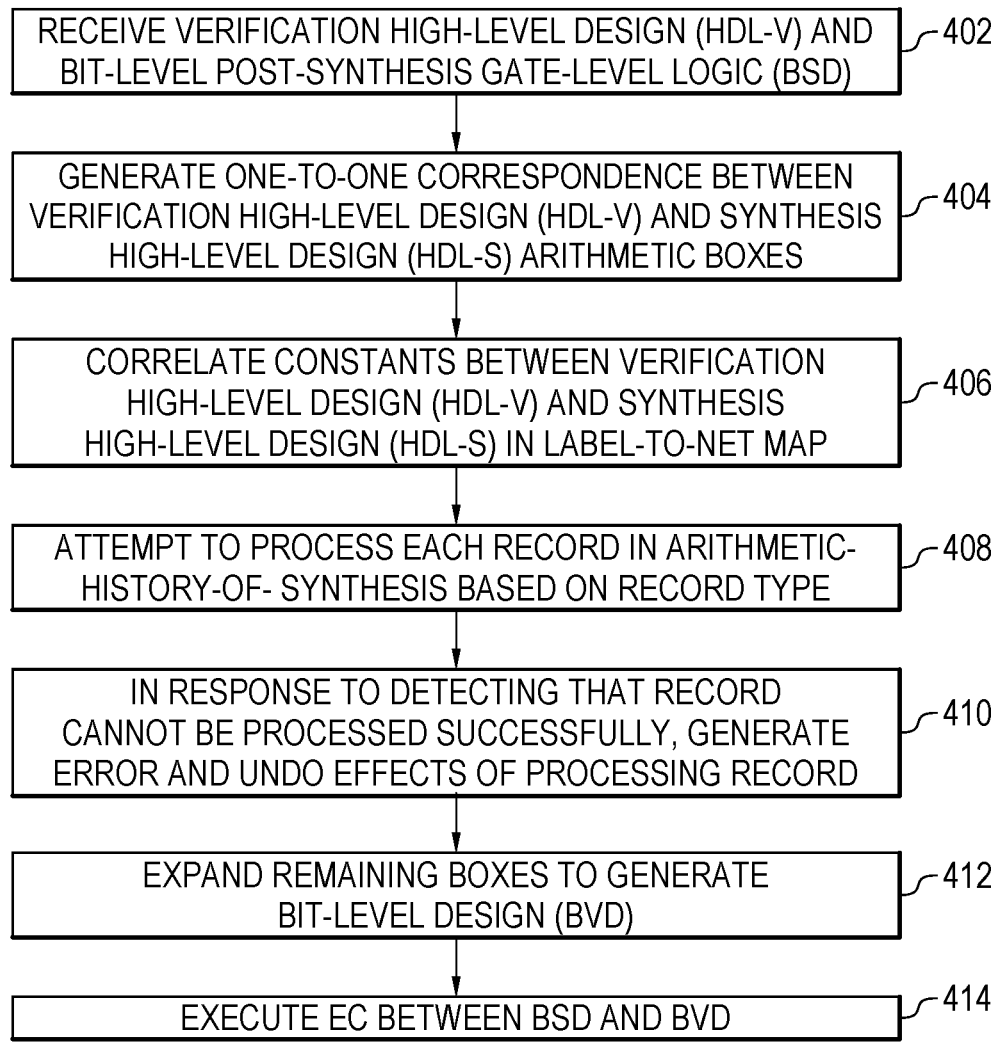
FIG. 4 is a process flow diagram of another example method that can perform equivalence checking using a synthesis history.

FIG. 4 is a process flow diagram of an example method that can perform equivalence checking using a synthesis history. The method 400 can be implemented with any suitable computing device, such as the computing device 500 of FIG. 5 and is described with reference to the system 100 of FIG. 1. For example, the methods described below can be implemented by the processor 502 or the processor 802 of FIGS. 5 and 8.

At block 402, a processor receives a high-level design (HDL-V) and a bit-level post-synthesis gate-level logic (BSD). For example, the HDL-V may be a verification flow version of an HDL describing a design synthesized to produce the BSD. In various examples, the BSD may include any number of arithmetic optimizations generated by a synthesis tool. The BSD may be in the form of Boolean logic. The HDL-V may include vectored arithmetic boxes.

At block 404, the processor generates a one-to-one correspondence between the HDL-V and synthesis high-level design (HDL-S) arithmetic boxes. For example, the processor may map each arithmetic box of the HDL-V to an arithmetic box of the HDL-S. For example, the processor may use the AHoS records to infer which boxes existed in the HDL-S design and how these related to the boxes in HDL-V. In this manner, the processor implicitly infers what the synthesis tool has done, and can thus replay inferred information on HDL-V. For example, the processor can thus generate a one-to-one correspondence between the HDL-V arithmetic boxes and the arithmetic boxes specified in Instance ADD, Instance_MULTIPLY, Instance_COMPARE records of an AHoS file.

At block 406, the processor correlates constants between a verification high-level design (HDL-V) and a synthesis high-level design (HDL-S) in a label-to-net map. For example, the processor can set a label of "0" to a constant-0 net and a label of "1" to a constant-1 net in the label-to-net map. For example, this mapping may be used to correlate constants between the synthesis and verification designs.

At block 408, the processor attempts to process each record in an arithmetic-history-of-synthesis based on record type. For example, the arithmetic-history-of-synthesis may store an arithmetic synthesis history. In various examples, the record types may include any of the basic record types described herein. In some examples, the record types may include any additional records added by a user.

At block 410, in response to detecting that a record cannot be processed successfully, the processor generates an error and undoes the effects of processing the record. For example, the optimization associated with replaying the record may be undone. In some examples, the error may be forwarded for review. In various examples, the processor can perform expansion, rewriting, and optimization without the replayed record.

At block 412, the processor expands remaining boxes to generate a bit level design (BVD). For example, the arithmetic-history-of-synthesis may not refer to some arithmetic boxes in the design, in which case the processor can use any correct-by-construction expansion for these boxes. As another example, the arithmetic-history-of-synthesis may not represent a full implementation for some adders, or may leave some vectored 2-operand adders, in which case the processor can use any correct-by-construction expansion for the remaining adders.

At block 414, the processor executes an equivalence check (EC) between the BSD and the BVD. For example, the processor may compare the BSD synthesized logic design to the generated BVD. In various examples, the EC may be a CEC. In some examples, the EC may be an SEC.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
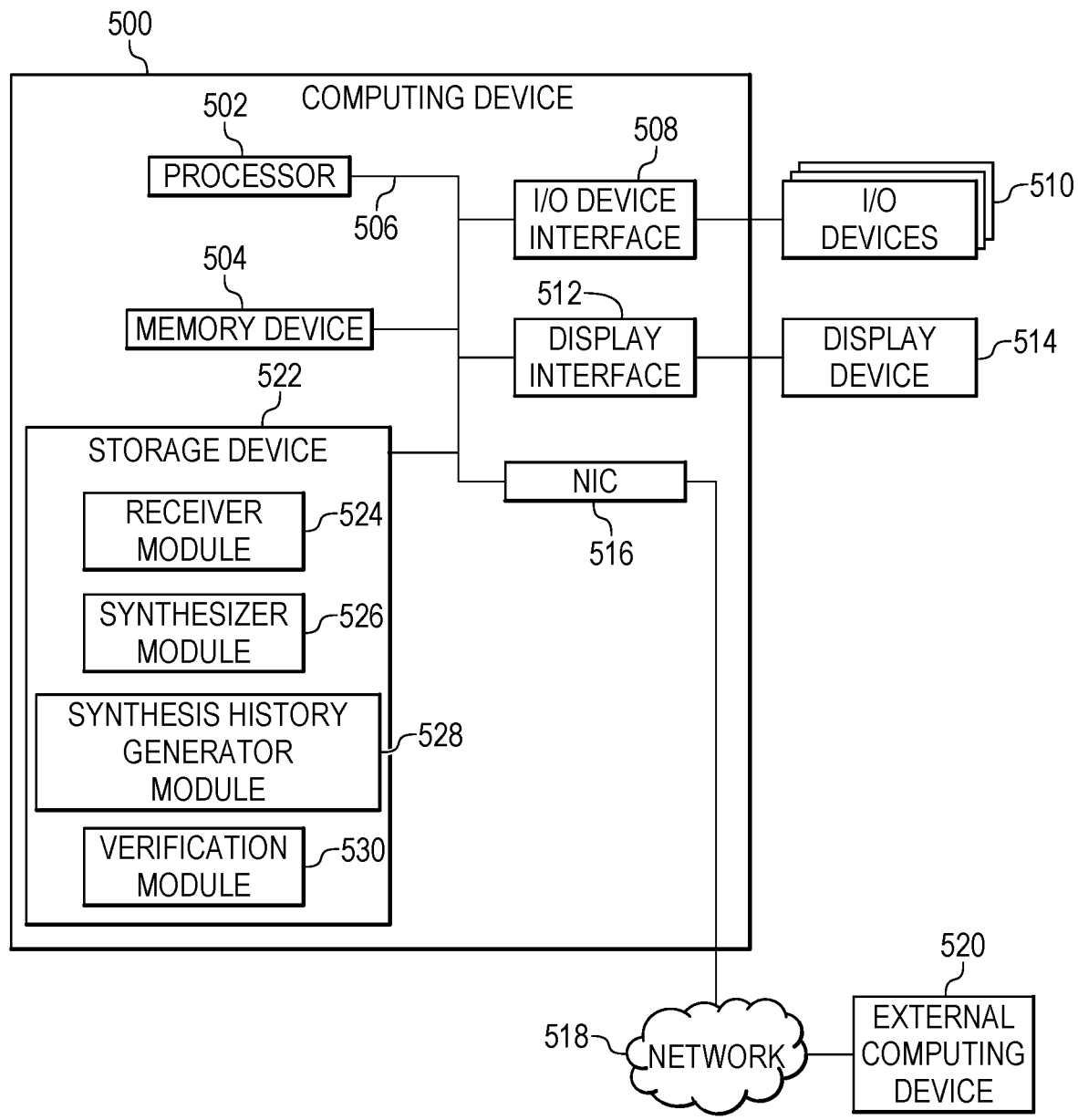
FIG. 5 is a block diagram of an example computing device that can perform equivalence checking using a synthesis history.

FIG. 5 is block diagram of an example computing device that can perform equivalence checking using a synthesis history. The computing device 500 may be for example, a server, desktop computer, laptop computer, tablet computer, or smartphone. In some examples, computing device 500 may be a cloud computing node. Computing device 500 may be described in the general context of computer system executable instructions, such as program modules, being executed by a computer system. Generally, program modules may include routines, programs, objects, components, logic, data structures, and so on that perform particular tasks or implement particular abstract data types. Computing device 500 may be practiced in distributed cloud computing environments where tasks are performed by remote processing devices that are linked through a communications network. In a distributed cloud computing environment, program modules may be located in both local and remote computer system storage media including memory storage devices.

The computing device 500 may include a processor 502 that is to execute stored instructions, a memory device 504 to provide temporary memory space for operations of said instructions during operation. The processor can be a single-core processor, multi-core processor, computing cluster, or any number of other configurations. The memory 504 can include random access memory (RAM), read only memory, flash memory, or any other suitable memory systems.

The processor 502 may be connected through a system interconnect 506 (e.g., PCI®, PCI-Express®, etc.) to an input/output (I/O) device interface 508 adapted to connect the computing device 500 to one or more I/O devices 510. The I/O devices 510 may include, for example, a keyboard and a pointing device, wherein the pointing device may include a touchpad or a touchscreen, among others. The I/O devices 510 may be built-in components of the computing device 500, or may be devices that are externally connected to the computing device 500.

The processor 502 may also be linked through the system interconnect 506 to a display interface 512 adapted to connect the computing device 500 to a display device 514.

The display device 514 may include a display screen that is a built-in component of the computing device 500. The display device 514 may also include a computer monitor, television, or projector, among others, that is externally connected to the computing device 500. In addition, a network interface controller (NIC) 516 may be adapted to connect the computing device 500 through the system interconnect 506 to the network 518. In some embodiments, the NIC 516 can transmit data using any suitable interface or protocol, such as the internet small computer system interface, among others. The network 518 may be a cellular network, a radio network, a wide area network (WAN), a local area network (LAN), or the Internet, among others. An external computing device 520 may connect to the computing device 500 through the network 518. In some examples, external computing device 520 may be an external webserver 520. In some examples, external computing device 520 may be a cloud computing node.

The processor 502 may also be linked through the system interconnect 506 to a storage device 522 that can include a hard drive, an optical drive, a USB flash drive, an array of drives, or any combinations thereof. In some examples, the storage device may include a receiver module 524, a synthesizer module 526, a synthesis history generator module 528, and a verification module 530. The receiver module 524 can receive a high-level design representation of a system architecture. For example, the high-level design representation of the system architecture may include logic described using a hardware design language (HDL). In some examples, the receiver module 524 can receive a post-synthesis BSD file. The synthesizer module 526 can synthesize a logic design and generate an associated synthesis history based on the high-level hardware design representation. For example, the logic design includes a gate-level netlist. In various examples, the synthesis history includes an arithmetic synthesis history generated and stored during an early synthesis and optimization of arithmetic primitives of the high-level representation. In various examples, the synthesis history includes a set of extensible basic record types. The synthesis history generator module 528 can generate and store an arithmetic synthesis history during early synthesis and optimization of arithmetic primitives of the high-level design representation. The verification module 530 can execute an equivalence check of the synthesized logic design based on the generated synthesis history. In various examples, the verification module 530 can replay the arithmetic synthesis history to perform similar modifications on the high-level design to generate a bit-level design (BVD). In some examples, the verification module 530 can execute an equivalence check by comparing the generated BVD to a post-synthesis BSD netlist. For example, the BVD and BSD netlist may each include Boolean logic. In some examples, some of the arithmetic synthesis is not replayable. For example, the verification module 530 can generate a report listing specific problematic records in response to detecting that all of the arithmetic synthesis history is not replayable. For example, a record of the arithmetic synthesis history may not be replayable due to a synthesis bug. In various examples, the replayed arithmetic synthesis history is used as a guidance for expansion, rewriting, and optimization of the high-level design.

It is to be understood that the block diagram of FIG. 5 is not intended to indicate that the computing device 500 is to include all of the components shown in FIG. 5. Rather, the computing device 500 can include fewer or additional components not illustrated in FIG. 5 (e.g., additional memory components, embedded controllers, modules, additional network interfaces, etc.). Furthermore, any of the functionalities of the receiver module 524, the synthesizer module 526, the synthesis history generator module 528, and the verification module 530 may be partially, or entirely, implemented in hardware and/or in the processor 502. For example, the functionality may be implemented with an application specific integrated circuit, logic implemented in an embedded controller, or in logic implemented in the processor 502, among others. In some embodiments, the functionalities of the receiver module 524, the synthesizer module 526, synthesis history generator module 528, and verification module 530 can be implemented with logic, wherein the logic, as referred to herein, can include any suitable hardware (e.g., a processor, among others), software (e.g., an application, among others), firmware, or any suitable combination of hardware, software, and firmware.

Figure 6:
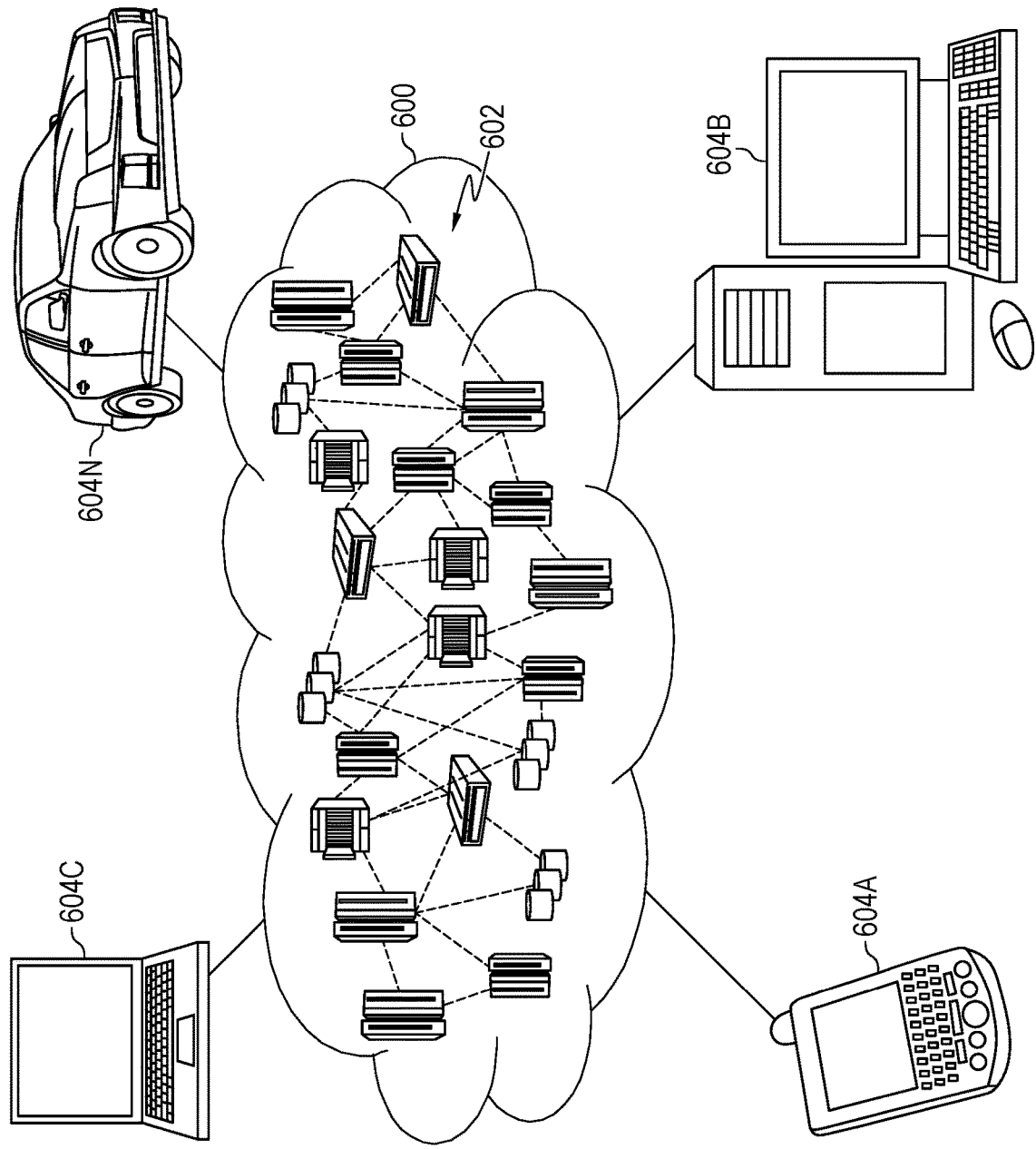
FIG. 6 is a diagram of an example cloud computing environment according to embodiments described herein.

Referring now to FIG. 6, illustrative cloud computing environment 600 is depicted. As shown, cloud computing environment 600 includes one or more cloud computing nodes 602 with which local computing devices used by cloud consumers, such as, for example, personal digital assistant (PDA) or cellular telephone 604A, desktop computer 604B, laptop computer 604C, and/or automobile computer system 604N may communicate. Nodes 602 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 604A-N shown in FIG. 6 are intended to be illustrative only and that computing nodes 602 and cloud computing environment 600 can communicate with any type of computerized device over any type of network and/or network addressable connection (e.g., using a web browser).

Figure 7:
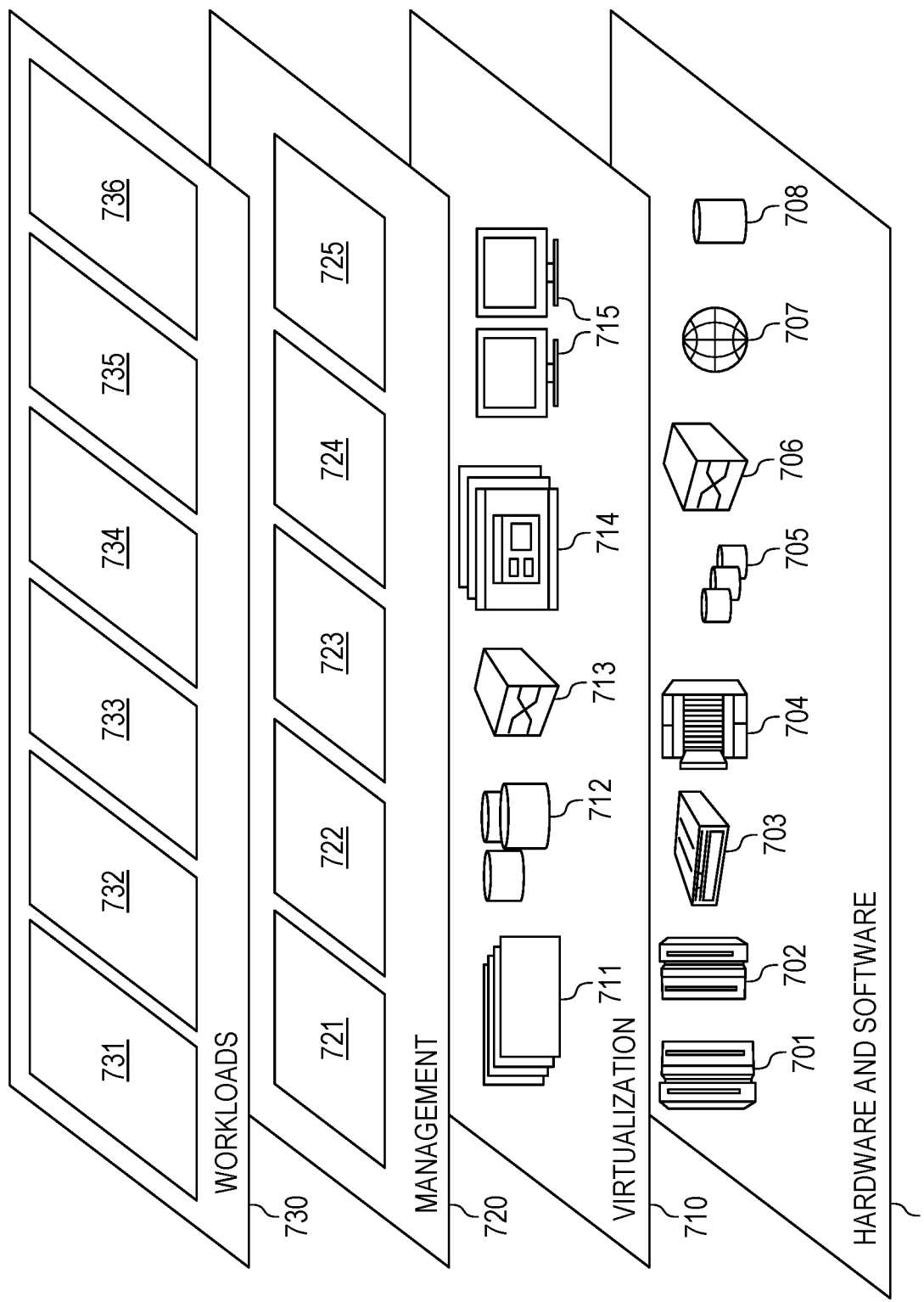
FIG. 7 is a diagram of an example abstraction model layers according to embodiments described herein.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 700 includes hardware and software components. Examples of hardware components include: mainframes 701; RISC (Reduced Instruction Set Computer) architecture based servers 702; servers 703; blade servers 704; storage devices 705; and networks and networking components 706. In some embodiments, software components include network application server software 707 and database software 708.

Virtualization layer 710 provides an abstraction layer from which the following examples of virtual entities may be provided: virtual servers 711; virtual storage 712; virtual networks 713, including virtual private networks; virtual applications and operating systems 714; and virtual clients 715.

In one example, management layer 720 may provide the functions described below. Resource provisioning 721 provides dynamic procurement of computing resources and other resources that are utilized to perform tasks within the cloud computing environment. Metering and Pricing 722 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 723 provides access to the cloud computing environment for consumers and system administrators. Service level management 724 provides cloud computing resource allocation and management such that required service levels are met. Service Level Agreement (SLA) planning and fulfillment 725 provide pre-arrangement for, and procurement of, cloud computing resources for which a future requirement is anticipated in accordance with an SLA.

Workloads layer 730 provides examples of functionality for which the cloud computing environment may be utilized. Examples of workloads and functions which may be provided from this layer include: mapping and navigation 731; software development and lifecycle management 732; virtual classroom education delivery 733; data analytics processing 734; transaction processing 735; and circuit logic equivalence checking 736.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
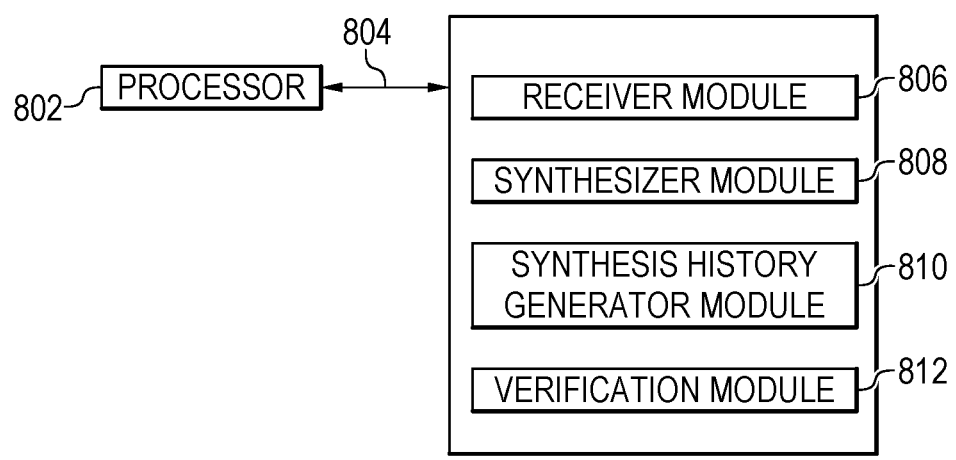
FIG. 8 is an example tangible, non-transitory computer-readable medium that can perform equivalence checking using a synthesis history.

Referring now to FIG. 8, a block diagram is depicted of an example tangible, non-transitory computer-readable medium 800 that can perform equivalence checking using a synthesis history. The tangible, non-transitory, computer-readable medium 800 may be accessed by a processor 802 over a computer interconnect 804. Furthermore, the tangible, non-transitory, computer-readable medium 800 may include code to direct the processor 802 to perform the operations of the methods 200-400 of FIGS. 2-4.

The various software components discussed herein may be stored on the tangible, non-transitory, computer-readable medium 800, as indicated in FIG. 8. For example, a receiver module 806 includes code to receive a high-level design representation of a system architecture. A synthesizer module 808 includes code to synthesize a logic design and generate an associated synthesis history based on the high-level hardware design representation. A synthesis history generator module 810 includes code to generate and store an arithmetic synthesis history during an early synthesis and optimization of arithmetic primitives of the high-level representation. The synthesis history generator module 808 also includes code to instrument the logic design with the associated synthesis history. A verification module 812 includes code to execute an equivalence check of the synthesized logic design based on the generated synthesis history. The verification module 812 also includes code to replay the synthesis history to generate a bit-level design representation used for the equivalence check. In various examples, the verification module 812 also includes code to compare the synthesized logic design to a generated bit-level design (BVD). For example, the synthesized logic design may include a bit-level post-synthesis gate-level logic (BSD) netlist.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 8 may be included within the tangible, non-transitory, computer-readable medium 800, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a processor set;
   one or more computer readable storage media; and
   program instructions stored on the one or more computer readable storage media to cause the processor set to perform operation comprising:
   receiving a high-level design representation of a system architecture;
   synthesizing a logic design;
   generating synthesis history based on the high-level design representation;
   storing the synthesis history as an external file that includes a list of records that correspond to expansion, rewriting, and optimization steps;
   replaying each record from the list of records of the synthesis history to perform similar modifications on the high-level design representation;
   generating a bit-level design representation for an equivalence check;
   executing the equivalence check by comparing the logic design to the bit-level design representation, wherein the logic design includes a bit-level post-synthesis gate-level logic netlist; and
   verifying no bugs are present in the bit-level design representation based on the equivalence check.

2. The system of claim 1, wherein the generating the synthesis history comprises:
   generating an arithmetic synthesis history during an early synthesis and optimization of arithmetic primitives of the high-level design representation.

3. The system of claim 1, wherein the synthesis history includes a set of extensible basic record types.

4. The system of claim 1, wherein the high-level design representation includes logic described using a hardware design language (HDL).

5. A method comprising:
   receiving, via a processor, a high-level design representation of a system architecture;
   synthesizing, via the processor, a logic design;
   generating, via the processor, synthesis history based on the high-level design representation;
   storing, via the processor, the synthesis history as an external file that includes a list of records that correspond to expansion, rewriting, and optimization steps;
   replaying, via the processor, each record from the list of records of the synthesis history to perform similar modifications on the high-level design representation;
   generating, via the processor, a bit-level design representation for an equivalence check;
   executing, via the processor, the equivalence check by comparing the logic design to the bit-level design representation, wherein the logic design includes a bit-level post-synthesis gate-level logic netlist; and
   verifying, via the processor, no bugs are present in the bit-level design representation based on the equivalence check.

6. The method of claim 5, wherein the generating the synthesis history further comprises:
   generating an arithmetic synthesis history during an early synthesis and optimizing arithmetic primitives of the high-level design representation.

7. The method of claim 5, wherein the synthesizing the logic design further comprises:
   instrumenting, via the processor, the logic design with the synthesis history.

8. A computer program product comprising:
one or more computer readable storage media; and
program instructions stored on the one or more computer readable storage media to perform operations comprising:
   receiving a high-level design representation of a system architecture;
   synthesizing a logic design;
   generating synthesis history based on the high-level design representation;
   storing the synthesis history as an external file that includes a list of records that correspond to expansion, rewriting, and optimization steps;
   replaying each record from the list of records of the synthesis history to perform similar modifications on the high-level design representation;
   generating a bit-level design representation for an equivalence check;
   executing the equivalence check by comparing the logic design to the bit-level design representation, wherein the logic design includes a bit-level post-synthesis gate-level logic netlist; and
   verifying no bugs are present in the bit-level design representation based on the equivalence check.

9. The computer program product of claim 8, wherein the generating the synthesis history comprises:
   generating an arithmetic synthesis history during an early synthesis and optimization of arithmetic primitives of the high-level design representation.

10. The computer program product of claim 8, wherein the synthesizing the logic design further comprises:
   instrumenting the logic design with the synthesis history.

11. The method of claim 5, wherein the synthesis history includes a set of extensible basic record types.

12. The method of claim 5, wherein the high-level design representation includes logic described using a hardware design language (HDL).

13. The computer program product of claim 8, wherein the synthesis history includes a set of extensible basic record types.

14. The computer program product of claim 8, wherein the high-level design representation includes logic described using a hardware design language (HDL).

* * * * *